(12) United States Patent
Enders

(10) Patent No.: US 8,500,155 B2
(45) Date of Patent: Aug. 6, 2013

(54) INFLATABLE AIRBAG ASSEMBLY WITH AN INTEGRAL COVER

(75) Inventor: Mark L. Enders, Pleasant View, UT (US)

(73) Assignee: Autoliv ASP, Inc., Ogden, UT (US)

( * ) Notice: Subject to any disclaimer, the term of this patent is extended or adjusted under 35 U.S.C. 154(b) by 437 days.

(21) Appl. No.: 12/645,130

(22) Filed: Dec. 22, 2009

(65) Prior Publication Data
US 2011/0148077 A1 Jun. 23, 2011

(51) Int. Cl.
- *B60R 21/217* (2011.01)
- *B60R 21/20* (2011.01)
- *B60R 21/206* (2011.01)
- *B60R 21/215* (2011.01)
- *B60R 21/2334* (2011.01)

(52) U.S. Cl.
USPC ............ 280/728.2; 280/728.3; 280/730.1; 280/732; 280/743.2

(58) Field of Classification Search
USPC .......... 280/728.3, 728.2, 730.1, 732, 743.2
See application file for complete search history.

(56) References Cited

U.S. PATENT DOCUMENTS

| | | |
|---|---|---|
| 3,858,822 A | 1/1975 | Wood |
| 3,904,222 A | 9/1975 | Bursott et al. |
| 3,966,227 A | 6/1976 | Cameron |
| 4,290,627 A | 9/1981 | Cumming et al. |
| 5,338,061 A | 8/1994 | Nelson et al. |
| 5,344,184 A | 9/1994 | Keeler et al. |
| 5,427,410 A | 6/1995 | Shiota et al. |
| 5,460,400 A | 10/1995 | Davidson |
| 5,529,337 A | 6/1996 | Takeda et al. |
| 5,669,627 A | 9/1997 | Marjanski et al. |
| 5,690,354 A | 11/1997 | Logan et al. |
| 5,765,867 A | 6/1998 | French |
| 5,772,239 A | 6/1998 | Seymour |
| 5,803,487 A | 9/1998 | Kikuchi et al. |
| 5,810,390 A | 9/1998 | Enders et al. |
| 5,823,566 A | 10/1998 | Manire |

(Continued)

FOREIGN PATENT DOCUMENTS

| | | |
|---|---|---|
| DE | 20 2006 014 012 | 8/2006 |
| DE | 10 2008 029810 | 12/2009 |

(Continued)

OTHER PUBLICATIONS

Amendment and Response to Restriction Requirement filed Jan. 17, 2012 in co-pending U.S. Appl. No. 12/611,676, now published as U.S. Publicaton No. US 2011/0101660.

(Continued)

*Primary Examiner* — Toan To
*Assistant Examiner* — George Spisich
(74) *Attorney, Agent, or Firm* — Stoel Rives LLP

(57) ABSTRACT

Inflatable airbag cushions can be rolled and/or folded into a housing assembly. The housing assembly aids in coupling an inflator to the airbag and a vehicle structure. The housing also couples the airbag to a vehicle structure. The housing can be mounted behind an knee bolster or steering wheel of a vehicle and has a cover that can be flush with the cabin side of the mounted position. The housing cover can be a cosmetically finished piece or a cosmetically unfinished piece. The housing cover can be an integral part of the housing, and may be used in combination with a one-piece inflator mounting bracket and heat shield.

19 Claims, 19 Drawing Sheets

U.S. PATENT DOCUMENTS

| | | | |
|---|---|---|---|
| 5,845,935 A | 12/1998 | Enders et al. | |
| 5,927,748 A | 7/1999 | O'Driscoll | |
| 6,010,147 A | 1/2000 | Brown | |
| 6,059,312 A | 5/2000 | Staub et al. | |
| 6,135,495 A | 10/2000 | Redgrave et al. | |
| 6,155,595 A | 12/2000 | Schultz | |
| 6,213,496 B1 | 4/2001 | Minami et al. | |
| 6,217,059 B1 | 4/2001 | Brown et al. | |
| 6,224,129 B1 | 5/2001 | Cisternino et al. | |
| 6,254,121 B1 | 7/2001 | Fowler et al. | |
| 6,299,205 B1 | 10/2001 | Keshavaraj | |
| 6,364,348 B1 | 4/2002 | Jang et al. | |
| 6,431,583 B1 | 8/2002 | Schneider | |
| 6,454,296 B1 | 9/2002 | Tesch et al. | |
| 6,464,255 B1 | 10/2002 | Preisler et al. | |
| 6,474,686 B1 | 11/2002 | Higuchi et al. | |
| 6,494,484 B2 | 12/2002 | Bosgieter et al. | |
| 6,588,793 B2 | 7/2003 | Rose | |
| 6,631,920 B1 | 10/2003 | Webber et al. | |
| 6,655,711 B1 | 12/2003 | Labrie et al. | |
| 6,682,093 B2 | 1/2004 | Tajima et al. | |
| 6,685,217 B2 | 2/2004 | Abe | |
| 6,715,789 B2 | 4/2004 | Takimoto et al. | |
| 6,752,417 B2 | 6/2004 | Takimoto et al. | |
| 6,846,005 B2 | 1/2005 | Ford et al. | |
| 6,877,765 B2 | 4/2005 | Rose et al. | |
| 6,913,280 B2 | 7/2005 | Dominissini et al. | |
| 6,945,557 B2 | 9/2005 | Takimoto et al. | |
| 6,959,944 B2 | 11/2005 | Mori et al. | |
| 6,962,363 B2 | 11/2005 | Wang et al. | |
| 6,962,366 B2 | 11/2005 | Fukuda et al. | |
| 7,000,945 B2 | 2/2006 | Bakhsh et al. | |
| 7,000,947 B2 | 2/2006 | Kumagai et al. | |
| 7,029,026 B2 | 4/2006 | Morita | |
| 7,055,851 B2 | 6/2006 | Takimoto et al. | |
| 7,131,664 B1 | 11/2006 | Pang et al. | |
| 7,147,247 B2 | 12/2006 | Hayakawa | |
| 7,156,418 B2 | 1/2007 | Sato et al. | |
| 7,175,195 B2 | 2/2007 | Morita | |
| 7,182,365 B2 | 2/2007 | Takimoto et al. | |
| 7,185,912 B2 | 3/2007 | Matsuura et al. | |
| 7,195,275 B2 | 3/2007 | Abe | |
| 7,195,280 B2 | 3/2007 | Wheelwright et al. | |
| 7,201,396 B2 | 4/2007 | Takimoto et al. | |
| 7,226,077 B2 | 6/2007 | Abe | |
| 7,232,149 B2 | 6/2007 | Hotta et al. | |
| 7,261,318 B2 | 8/2007 | Enders | |
| 7,281,734 B2 | 10/2007 | Abe et al. | |
| 7,314,228 B2 | 1/2008 | Ishiguro et al. | |
| 7,314,230 B2 | 1/2008 | Kumagai et al. | |
| 7,347,444 B2 | 3/2008 | Wheelwright | |
| 7,370,881 B2 | 5/2008 | Takimoto et al. | |
| 7,374,201 B2 | 5/2008 | Chausset | |
| 7,374,202 B2 | 5/2008 | Lim | |
| 7,380,813 B2 | 6/2008 | Lanzinger et al. | |
| 7,384,065 B2 | 6/2008 | Takimoto et al. | |
| 7,387,311 B2 | 6/2008 | Kanno et al. | |
| 7,396,044 B2 | 7/2008 | Bauer et al. | |
| 7,434,837 B2 | 10/2008 | Hotta et al. | |
| 7,438,310 B2 | 10/2008 | Takimoto et al. | |
| 7,487,994 B2 | 2/2009 | Okada et al. | |
| 7,549,672 B2 | 6/2009 | Sato et al. | |
| 7,566,074 B2 | 7/2009 | Hawthorn et al. | |
| 7,568,724 B2 | 8/2009 | Kutchey et al. | |
| 7,568,730 B2 | 8/2009 | Kwon | |
| 7,631,894 B2 | 12/2009 | Hasebe et al. | |
| 7,641,223 B2 | 1/2010 | Knowlden | |
| 7,658,408 B2 | 2/2010 | Zofchak et al. | |
| 7,658,409 B2 | 2/2010 | Ford et al. | |
| 7,695,013 B2 | 4/2010 | Kakstis et al. | |
| 7,712,769 B2 | 5/2010 | Hasebe et al. | |
| 7,717,460 B2 | 5/2010 | Franke et al. | |
| 7,744,118 B2 | 6/2010 | Takimoto et al. | |
| 7,748,739 B2 | 7/2010 | Brinker | |
| 7,753,405 B2 | 7/2010 | Ishiguro et al. | |
| 7,753,407 B2 | 7/2010 | Yokota | |
| 7,766,374 B2 | 8/2010 | Abele et al. | |
| 7,793,973 B2 | 9/2010 | Sato et al. | |
| 7,798,517 B2 | 9/2010 | Ishida | |
| 7,819,419 B2 | 10/2010 | Hayashi et al. | |
| 7,878,540 B2 | 2/2011 | Takimoto et al. | |
| 8,083,254 B2 | 12/2011 | Enders et al. | |
| 8,118,325 B2 | 2/2012 | Enders et al. | |
| 8,272,667 B2 | 9/2012 | Schneider et al. | |
| 8,297,649 B2 | 10/2012 | Enders | |
| 8,297,650 B2 | 10/2012 | Enders | |
| 2001/0007391 A1 | 7/2001 | Hamada et al. | |
| 2002/0044819 A1 | 4/2002 | Shamoon | |
| 2002/0149187 A1 | 10/2002 | Holtz et al. | |
| 2002/0171231 A1 | 11/2002 | Takimoto et al. | |
| 2002/0180187 A1 | 12/2002 | Hayashi | |
| 2003/0034637 A1 | 2/2003 | Wang et al. | |
| 2003/0209888 A1 | 11/2003 | Davis, Jr. et al. | |
| 2005/0001412 A1 | 1/2005 | Schneider et al. | |
| 2005/0057028 A1 | 3/2005 | Hayakawa | |
| 2005/0062265 A1 | 3/2005 | Hotta et al. | |
| 2005/0151351 A1 | 7/2005 | Enders et al. | |
| 2005/0194767 A1* | 9/2005 | Freisler et al. | 280/728.2 |
| 2005/0194771 A1 | 9/2005 | Clark et al. | |
| 2005/0212275 A1 | 9/2005 | Hasebe | |
| 2005/0230939 A1 | 10/2005 | Abe et al. | |
| 2006/0279073 A1 | 12/2006 | Hotta et al. | |
| 2007/0057487 A1 | 3/2007 | Kim | |
| 2007/0120346 A1 | 5/2007 | Kwon | |
| 2007/0200321 A1 | 8/2007 | Heitplatz et al. | |
| 2007/0246920 A1 | 10/2007 | Abele et al. | |
| 2007/0267852 A1 | 11/2007 | Enders | |
| 2008/0048418 A1* | 2/2008 | Remley et al. | 280/728.2 |
| 2008/0157509 A1 | 7/2008 | Abe et al. | |
| 2008/0217892 A1 | 9/2008 | Maripudi et al. | |
| 2008/0238048 A1 | 10/2008 | Ishida | |
| 2009/0045607 A1 | 2/2009 | Fukuyama et al. | |
| 2009/0058048 A1 | 3/2009 | Ishida et al. | |
| 2009/0058052 A1 | 3/2009 | Ford et al. | |
| 2009/0085333 A1 | 4/2009 | Imaeda et al. | |
| 2009/0134611 A1 | 5/2009 | Wigger et al. | |
| 2009/0146400 A1 | 6/2009 | Knowlden | |
| 2009/0152842 A1 | 6/2009 | Benny et al. | |
| 2009/0152847 A1 | 6/2009 | Hong et al. | |
| 2009/0184498 A1 | 7/2009 | Takimoto et al. | |
| 2009/0212541 A1 | 8/2009 | Wallat et al. | |
| 2009/0242308 A1 | 10/2009 | Kitte et al. | |
| 2010/0025973 A1 | 2/2010 | Jang et al. | |
| 2010/0090445 A1 | 4/2010 | Williams et al. | |
| 2010/0270775 A1 | 10/2010 | Enders et al. | |
| 2010/0270779 A1 | 10/2010 | Enders et al. | |
| 2010/0270782 A1 | 10/2010 | Enders et al. | |
| 2011/0012327 A1 | 1/2011 | Enders | |
| 2011/0101660 A1 | 5/2011 | Schneider et al. | |
| 2011/0148077 A1 | 6/2011 | Enders | |
| 2012/0025496 A1 | 2/2012 | Schneider et al. | |
| 2012/0049488 A1 | 3/2012 | Enders | |
| 2012/0049497 A1 | 3/2012 | Enders | |

FOREIGN PATENT DOCUMENTS

| | | |
|---|---|---|
| WO | WO 02/04262 | 1/2002 |
| WO | WO 2010/126623 | 11/2010 |
| WO | WO-2011/008916 | 1/2011 |
| WO | WO-2011/056810 | 5/2011 |
| WO | WO-2011/079178 | 6/2011 |
| WO | WO-2012/030482 | 3/2012 |

OTHER PUBLICATIONS

Notification of Transmittal of the International Search Report and the Written Opinion of the International Searching Authority mailed Jan. 26, 2012 in International Application No. PCT/US2011/046952.

Restriction and/or Election Requirement mailed Jan. 20, 2011 in co-pending U.S. Appl. No. 12/430,562, now published as U.S. Publication No. US 2010/0270775.

Amendment and Response to Requirement of Election of Species filed Feb. 22, 2011 in co-pending U.S. Appl. No. 12/430,562, now published as U.S. Publication No. US 2010/0270775.

Office Action mailed Mar. 30, 2011 in co-pending U.S. Appl. No. 12/430,562, now published as U.S. Publication No. US 2010/0270775.

Office Action mailed Jan. 21, 2011 in co-pending U.S. Appl. No. 12/430,274, now published as U.S. Publication No. US 2010/0270779.
Office Action mailed Dec. 13, 2010 in co-pending U.S. Appl. No. 12/504,544, now published as U.S. Publication No. US 2011/0012327.
Notification of Transmittal of the International Search Report and the Written Opinion of the International Searching Authority mailed Feb. 18, 2011 in International Application No. PCT/US2010/061744.
Notification of Transmittal of the International Search Report and the Written Opinion of the International Searching Authority mailed Jan. 3, 2011 in International Application No. PCT/US2010/055197.
Non-Final Office action mailed Mar. 8, 2012 in co-pending U.S. Appl. No. 12/611,676, now published as U.S. Publication No. US 2011/0101660.
Non-Final Office action mailed Mar. 12, 2012 in co-pending U.S. Appl. No. 12/872,323, now published as U.S. Publication No. US 2012/0049488.
Amendment and Response to Office Action filed Jun. 30, 2011 in co-pending U.S. Appl. No. 12/430,562, now published as U.S. Publication No. US 2010/0270775.
Examiner's Interview Summary mailed Jul. 6, 2011 in co-pending U.S. Appl. No. 12/430,562, now published as U.S. Publication No. US 2010/0270775.
Notice of Allowance and Fee(s) Due mailed Aug. 23, 2011 in co-pending U.S. Appl. No. 12/430,562, now published as U.S. Publication No. US 2010/0270775.
Amendment and Response to Office Action filed Jul. 21, 2011 in co-pending U.S. Appl. No. 12/430,274, now published as U.S. Publication No. US 2010/0270779.
Amendment and Response to Office Action filed Apr. 28, 2011 in co-pending U.S. Appl. No. 12/430,246, now published as U.S. Publication No. US 2010/0270782.
Final Office Action mailed Jun. 24, 2011 in co-pending U.S. Appl. No. 12/430,246, now published as U.S. Publication No. US 2010/0270782.
Amendment and Response to Office Action filed Jun. 13, 2011 in co-pending U.S. Appl. No. 12/504,544, now published as U.S. Publication No. US 2011/0012327.
Final Office Action mailed Jun. 29, 2011 in co-pending U.S. Appl. No. 12/504,544, now published as U.S. Publication No. US 2011/0012327.
Examiner's Interview Summary mailed Jul. 7, 2011 in co-pending U.S. Appl. No. 12/504,544, now published as U.S. Publication No. US 2011/0012327.
Restriction Requirement mailed Sep. 15, 2010 in co-pending U.S. Appl. No. 12/430,246.
Amendment and Response to Requirement for Election of Species filed Oct. 12, 2010 in co-pending U.S. Appl. No. 12/430,246.
Preliminary Amendment filed Aug. 31, 2009 in co-pending U.S. Appl. No. 12/504,544.
Preliminary Amendment filed Jul. 15, 2010 in co-pending U.S. Appl. No. 12/504,544.
Notification of Transmittal of the International Search Report and the Written Opinion of the International Searching Authority mailed Mar. 30, 2010 in International Application No. PCT/US2010/021343.
Notification of Transmittal of the International Search Report and the Written Opinion of the International Searching Authority mailed Sep. 23, 2010 in International Application No. PCT/US2010/042070.
Co-pending U.S. Appl. No. 12/430,562, titled Knee Airbag Assemblies Configured for Inflator Insertion and Inflator-Mediated Coupling to an Airbag Housing, filed Apr. 27, 2009.
Co-pending U.S. Appl. No. 12/430,274, titled Inflatable Knee Airbags and Internal Tethers Produced From Single Panels of Material, filed Apr. 27, 2009.
Co-pending U.S. Appl. No. 12/430,246, titled Inflatable Knee Airbags Assemblies With Bag Straps for Wrapping the Airbags and Optimizing Deployment, filed Apr. 27, 2009.
Co-pending U.S. Appl. No. 12/504,544, titled Inflatable Knee Airbag Having Two Chambers Separated by an Internal Tether, filed Jul. 16, 2009.
Co-pending U.S. Appl. No. 12/611,676, titled Low-Mount Inflatable Knee Airbags Having Serial Chambers, filed Nov. 3, 2009.
Co-pending U.S. Appl. No. 12/872,323, titled Covers for Inflatable Knee Airbag Housings, filed Aug. 31, 2010.
Co-pending U.S. Appl. No. 12/872,946, titled Inflatable Knee Airbag Assemblies With Articulating Housings, filed Aug. 31, 2010.
Notice of Allowance and Fee(s) Due mailed Oct. 18, 2011 in co-pending U.S. Appl. No. 12/430,274, now published as U.S. Publication No. US 2010/0270779.
Amendment and Response After Final filed Aug. 29, 2011 in co-pending U.S. Appl. No. 12/504,544, now published as U.S. Publication No. US 2011/0012327.
Advisory Action mailed Sep. 9, 2011 in co-pending U.S. Appl. No. 12/504,544, now published as U.S. Publication No. US 2011/0012327.
Request for Continued Examination filed Oct. 6, 2011 in co-pending U.S. Appl. No. 12/504,544, now published as U.S. Publication No. US 2011/0012327.
Office Action mailed Dec. 1, 2011 in co-pending U.S. Appl. No. 12/504,544, now published as U.S. Publication No. US 2011/0012327.
Restriction Requirement mailed Dec. 14, 2011 in co-pending U.S. Appl. No. 12/611,676, now published as U.S. Publication No. US 2011/0101660.
Restriction Requirement mailed Oct. 27, 2011 in co-pending U.S. Appl. No. 12/872,946.
Amendment and Response to Requirement of Election of Species filed Nov. 28, 2011 in co-pending U.S. Appl. No. 12/872,946.
Office Action mailed Dec. 14, 2011 in co-pending U.S. Appl. No. 12/872,946.
Co-pending U.S. Appl. No. 13/270,462, titled Knee Airbag Assemblies and Related Methods, filed Oct. 11, 2011.
Co-pending U.S. Appl. No. 13/290,856, titled Knee Airbag Folding Patterns and Assemblies and Related Methods, filed Nov. 7, 2011.
Office Action mailed Oct. 29, 2010 in co-pending U.S. Appl. No. 12/430,246, now published as U.S. Publication No. US 2010/0270782.
Amendment and Response to Office Action filed May 29, 2012 in co-pending U.S. Appl. No. 12/504,544, now published as U.S. Publication No. US 2011/0012327.
Notice of Allowance and Fee(s) Due mailed Jun. 28, 2012 in co-pending U.S. Appl. No. 12/504,544, now published as U.S. Publication No. US 2011/0012327.
Amendment and Response to Office Action filed Jun. 8, 2012 in co-pending U.S. Appl. No. 12/611,676, now published as U.S. Publication No. US 2011/0101660.
Notice of Allowance and Fee(s) Due mailed Jun. 19, 2012 in co-pending U.S. Appl. No. 12/611,676, now published as U.S. Publication No. US 2011/0101660.
Amendment and Response to Office Action filed Sep. 12, 2012 in co-pending U.S. Appl. No. 12/872,323, now published as U.S. Publication No. US 2012/0049488.
Amendment and Response to Office Action filed Jun. 14, 2012 in co-pending U.S. Appl. No. 12/872,946, now published as U.S. Publication No. US 2012/0049497.
Notice of Allowance and Fee(s) Due mailed Jun. 28, 2012 in co-pending U.S. Appl. No. 12/872,946, now published as U.S. Publication No. US 2012/0049497.
Notice of Allowance and Fee(s) Due Mailed Oct. 4, 2012 in co-pending U.S. Appl. No. 12/872,323, now published as U.S. Publication No. US 2012/0049488.
Office Action mailed Nov. 6, 2012 in co-pending U.S. Appl. No. 13/270,462, now published as U.S. Publication No. US 2012/0025496.

* cited by examiner

INFLATABLE AIRBAG ASSEMBLY WITH AN INTEGRAL COVER

TECHNICAL FIELD

The present disclosure relates generally to the field of automotive protective systems. More specifically, the present disclosure relates to housing and mounting assemblies for inflatable airbag cushions.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to an inflatable curtain airbag, overhead airbag, front airbag, or any other airbag type.

Figure 1A:
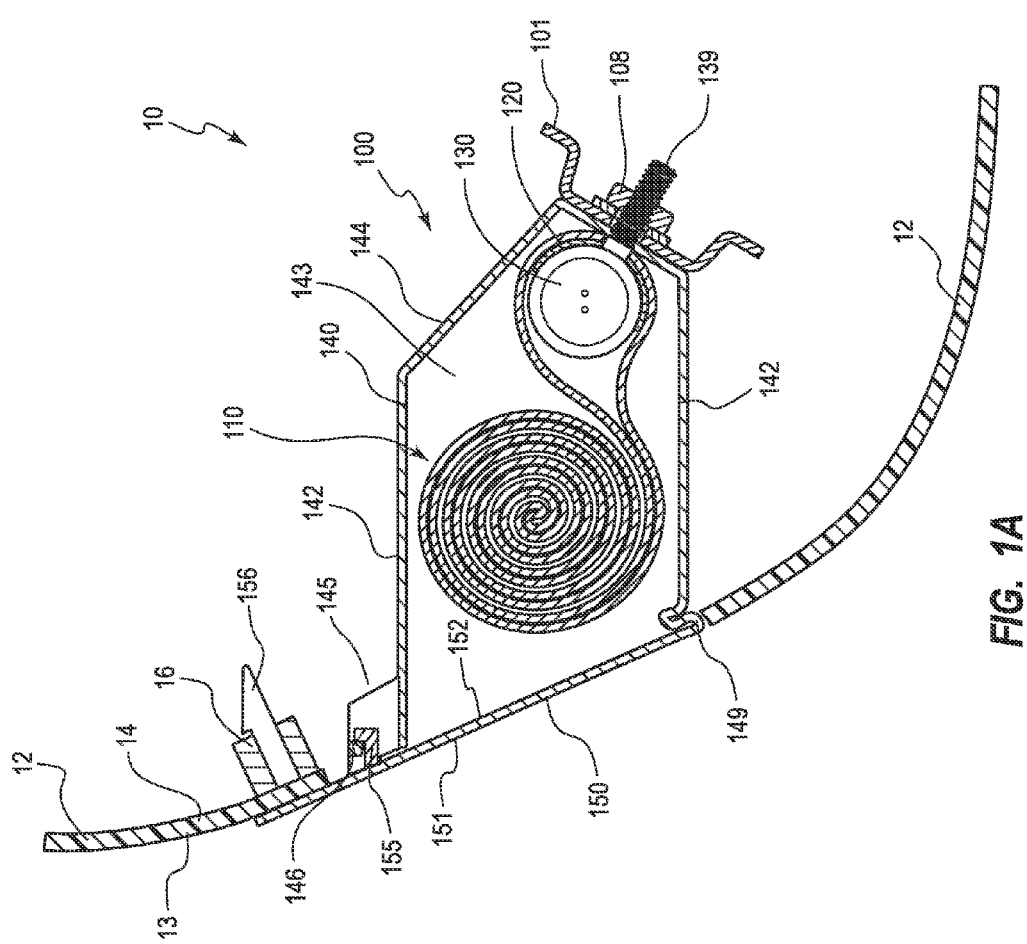
FIG. 1A is a cross-sectional view of an inflatable airbag assembly comprising an inflatable airbag housing assembly with an integral cover, wherein the airbag assembly is in a packaged configuration.

FIG. 1A depicts airbag assembly 100 from a cross sectional view, wherein assembly 100 has been mounted within a vehicle 10. Inflatable airbag assembly 100 may comprise a housing mounting bracket 101, an inflatable airbag cushion 110, an inflator mounting bracket 120, an inflator 130, and a housing 140. Housing 140 comprises an integrated cover 150, such that housing 140 may be said to comprise a one-piece housing with a cover that is attached via a hinge 149. Inflatable airbag assembly 100 may be said to comprise an inflatable airbag housing assembly.

Inflator mounting bracket 120 may comprise high strength steel (HHS), such as HSS grade 50. However, in other embodiments, inflator mounting bracket 120 may comprise other suitable steel alloys, engineering plastics and/or composite materials. Inflator mounting bracket 120 serves as a heat shield and also functions to increase a distance between attachment points of cushion 110 to housing 140. Inflator mounting apertures 117 and/or inflator insert aperture 118, as well as housing apertures 147 are examples of attachment points between cushion 110 and housing 140 (depicted in FIGS. 3 and 7).

Inflator 130 may comprise a mounting structure 139, which may comprise a mounting stem, such as a threaded bolt. Mounting structure 139 is configured to protrude through apertures in the inflatable airbag, the inflator mounting bracket, the housing, the housing mounting bracket, and a complementary mounting hardware, such as nut 108. Inflatable airbag housing 140 may comprise a contiguous piece of a molded plastic material that comprises four sidewalls, which define an interior space 143, a back wall 144, a plurality of cover closure structures 145, a plurality of mounting apertures (not visible), and hinge 149.

Housing 140 and cover 150 may comprise one or more of several materials that are well known in the art, including: Nylon; SEBS (Styrene Ethylene Butylene Styrene block copolymers); polyolefin monomers or co-block polymers; polypropylene monomers or co-block polymers; thermoplastic elastomer olefin (TEO), and thermoplastic polyester elastomers (TPE). These materials may be sold under the following trade names: Hytrel; Tefabloc; Tosl; Sumitomo; Tekron; Basell; Hostacom; Multiflex; and TES.

Housing 140 sidewalls comprise longitudinal sidewalls 142 and lateral sidewalls (not visible). Back wall 144 may comprise a single, linear surface, or a plurality of surfaces, as depicted in FIG. 1A. Cover closure structures 145 may each comprise a protrusion 146 that is configured to interact with a structure on cover closure structures 155. Cover 150 has a first face 151 and a second face 152, and may comprise a plurality of cover closure structures 155. Inflatable airbag assembly 100 may be mounted within vehicle 10 at or below a knee bolster portion 12 of an instrument panel or below a steering wheel. The knee bolster portion of an instrument panel may be said to comprise approximately a lower half of the instrument panel.

In the depicted embodiment, airbag assembly 100 is coupled within vehicle via a plurality of coupling structures 156, located on cover 150, and complementary coupling structures 16 located on a rear face 14 of knee bolster 12. Airbag assembly 100 may be said to be in a packaged configuration, in the view of FIG. 1A, wherein the inflatable airbag 110 is rolled and/or folded. In the depiction of FIG. 1A, cover 150 comprises a curved surface; however, in other embodiments, the cover of the airbag housing may not be curved. Further, airbag assembly 100 is depicted as being mounted at a middle portion of knee bolster 12; however in other embodiments, the airbag assembly may be mounted high on the knee bolster, low on the knee bolster, or below the knee bolster. Also, in the depicted embodiment, cover 150 is depicted as being flush with a front face 13 of knee bolster 12; however, in other embodiments, the cover may be located in front of, or behind the knee bolster.

Figure 1B:
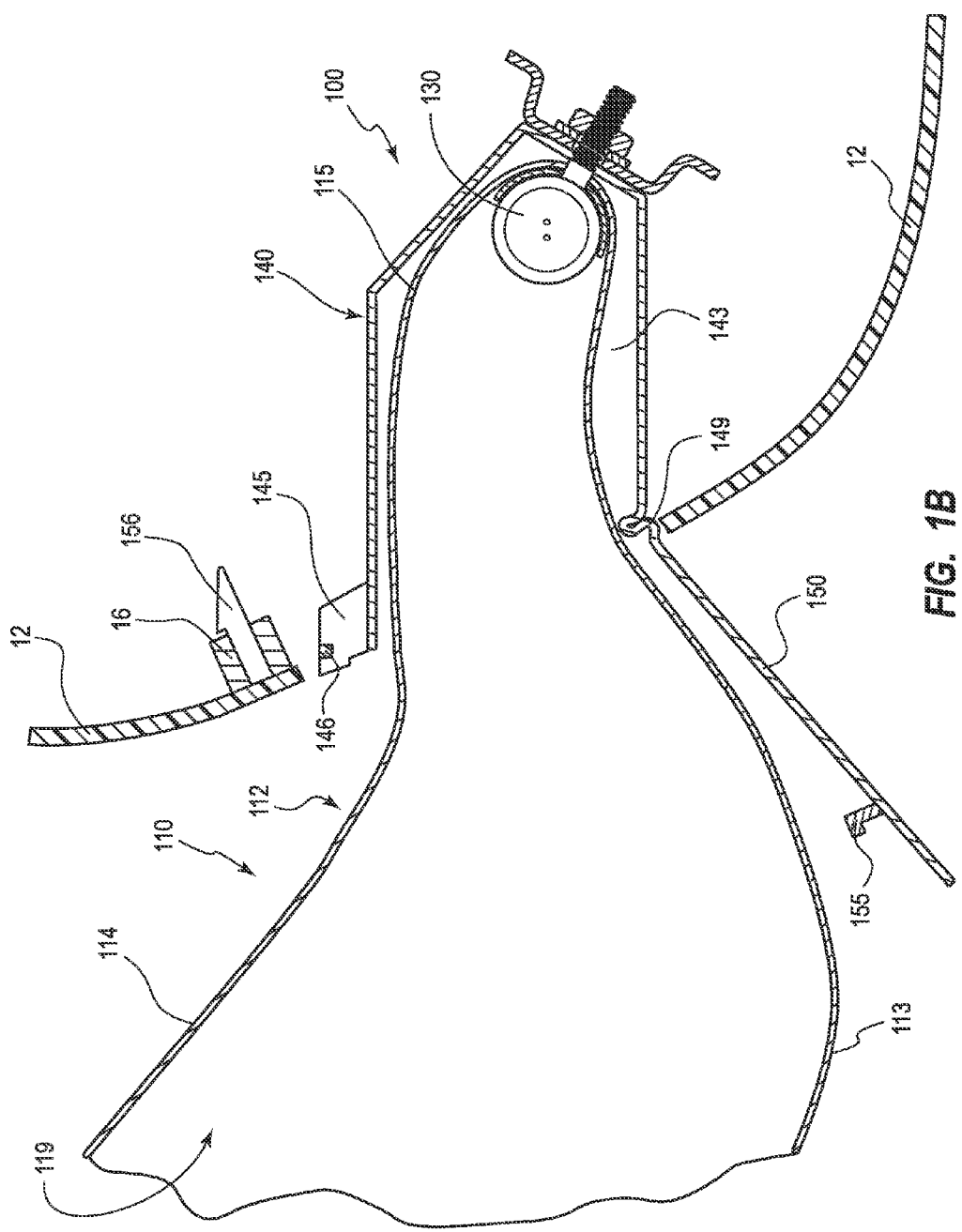
FIG. 1B is a cross-sectional view of the inflatable airbag assembly of FIG. 1A, wherein the airbag and housing assembly are in a deployed configuration.

FIG. 1B is a cross-sectional view of airbag assembly 100 of FIG. 1A, wherein airbag 110 is depicted in a deployed configuration. Airbag 110 is configured to become inflated upon activation of inflator 130 such that the inflatable airbag transitions from the packaged configuration to the deployed configuration. Airbag 110 may be described as having an upper portion (not visible), a lower portion 112, a first face 113, a second face 114, and an inflator attachment portion 115, which may comprise a throat portion. The inflator attachment portion may also be called a "throat" or "neck" portion of the airbag. The various faces of inflatable airbag 110 define an interior inflatable void 119, which is in fluid communication with inflator 130. The various faces of inflatable airbag 110 may comprise separate panels of material, or may be formed from a single panel of material that is folded. Airbag 110 may comprise a woven nylon fabric.

The upper portion of inflatable airbag 110 is the portion of the airbag that is closest to the headliner of a vehicle when the airbag is in a deployed state. Lower portion 112 is below upper portion 111 when inflatable airbag 110 is in a deployed state, and is closest to a floor of the vehicle. The term "lower portion" is not necessarily limited to the portion of inflatable airbag 110 that is below a horizontal medial plane of the inflatable airbag, but may include less than half, more than half or exactly half of the bottom portion of the inflatable airbag. Likewise, the term "upper portion" is not necessarily limited to the portion of inflatable airbag 110 that is above a horizontal medial plane of the inflatable airbag, but may include less than half, more than half or exactly half of the top portion of the inflatable airbag.

In the depiction of FIG. 1B, cover 150 has rotated about hinge 149 such that airbag 110 can exit interior space 143. The force of inflation gas inflating airbag 110 may apply pressure to cover 150, thereby forcing the cover to open. Cover 150 closure structure 155 has been released from closure structure 145 on the housing by the "L" shaped structure 155 being pulled off protrusion 146. Coupling structure 156 is depicted comprising a hook structure that has broken away from cover 150, such that it is retained by closing structure 16 on knee bolster 12; however in other embodiments, the coupling structure may comprise a different structure and may not break away when the cover is opened during airbag deployment. Coupling structure 156 may generically be referred to as a "push pin" type of coupling structure. In the depicted embodiment, the push pin coupling structure may be described as a clip; the clip may comprise a prong arm, wherein when the attachment member is pressed into a mounting aperture, the prong arm compresses and then snaps back as it passes through the aperture. Other types of push pins include "christmas tree" clips, which may also be called ribbed shank push pins.

As will be appreciated by those skilled in the art, a variety of types and configurations of inflatable airbag membranes can be utilized without departing from the scope and spirit of the present disclosure. For example, the size, shape, and proportions of the airbag membrane may vary according to its use in different vehicles or different locations within a vehicle such that the airbag may comprise an inflatable cushion; a rear passenger side airbag; a driver's airbag; and/or a front passenger airbag. Also, the airbag may comprise one or more of any material well known in the art, such as a woven nylon fabric, which may be coated with a substance, such as silicone. Additionally, the airbag cushion may be manufactured using a variety of techniques such as one piece weaving, cut and sew, or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

Figure 2:
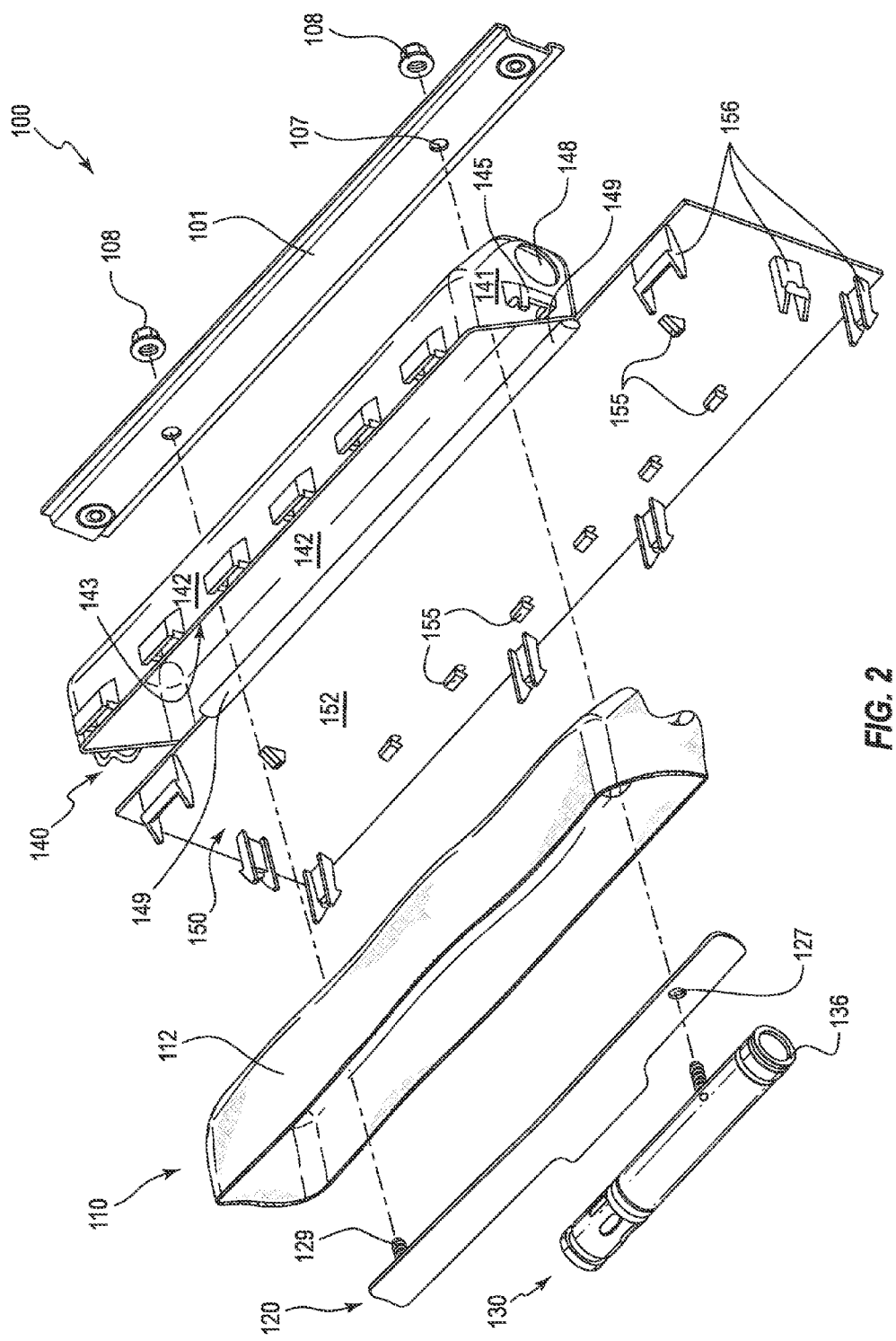
FIG. 2 is a front exploded perspective view of one embodiment of an inflatable airbag housing assembly having an integrated cover.
Figure 3:
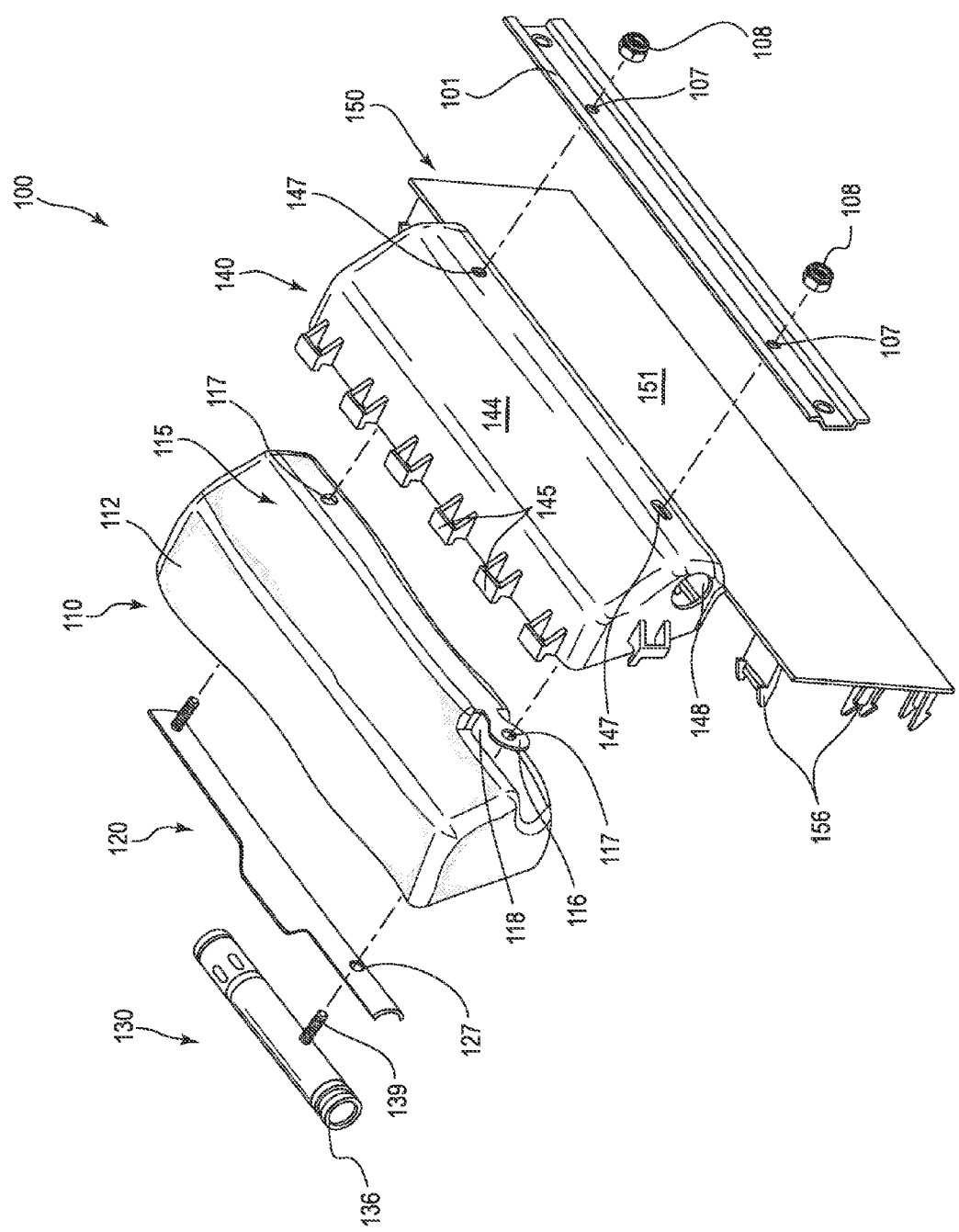
FIG. 3 is a rear exploded perspective of the housing assembly as depicted in FIG. 2.

FIGS. 2-3 are exploded perspective views of inflatable airbag assembly 100. As described earlier, inflator 130 comprises a terminus 136 and mounting stem 139. Mounting stem 139 is configured to protrude through aperture 127 of inflator mounting bracket 120, aperture 117 of mounting tab 116, which is located on bottom portion 112 of airbag 110, aperture 147 in housing 140, and aperture 107 of housing mounting bracket 101. Inflator mounting bracket 120 comprises a mounting stem 129, which may be configured similarly as mounting stem 139 of inflator 130. As such, stem 139 may protrude through aperture 117 in inflator mounting tab 116 of airbag 110, aperture 147 in housing 140, and aperture 107 in housing mounting bracket 101. Both mounting stems 129 and 139 may each be configured to receive a nut 108. Inflator 130 and inflator mounting bracket 120 are configured to fit within bottom portion 112 or throat 115 of airbag 110, which itself is configured to fit within interior space 143 and against back wall 144.

As described above, interior space 143 of housing 140 is partially defined by lateral sidewalls 141 and longitudinal sidewalls 142. Cover closures 145 are positioned on the sidewalls and are configured to receive cover closures 155 on cover 150. One of the lateral sidewalls may comprise an inflator insert aperture 148, which is configured to be aligned with inflator insert aperture 118 of cushion 110 such that terminus 136 of inflator 130 can be accessed even after assembly 100 is in a packaged configuration. Cover 150 is depicted in an open configuration, wherein first face 151 is oriented toward back wall 144 and second face 152 is oriented toward airbag 110. Cover 150 comprises cover closures 155 and housing mounting coupling structures 156. Cover 150 is configured to rotate about hinge 149 so that the cover can be reversibly closed.

Figure 4:
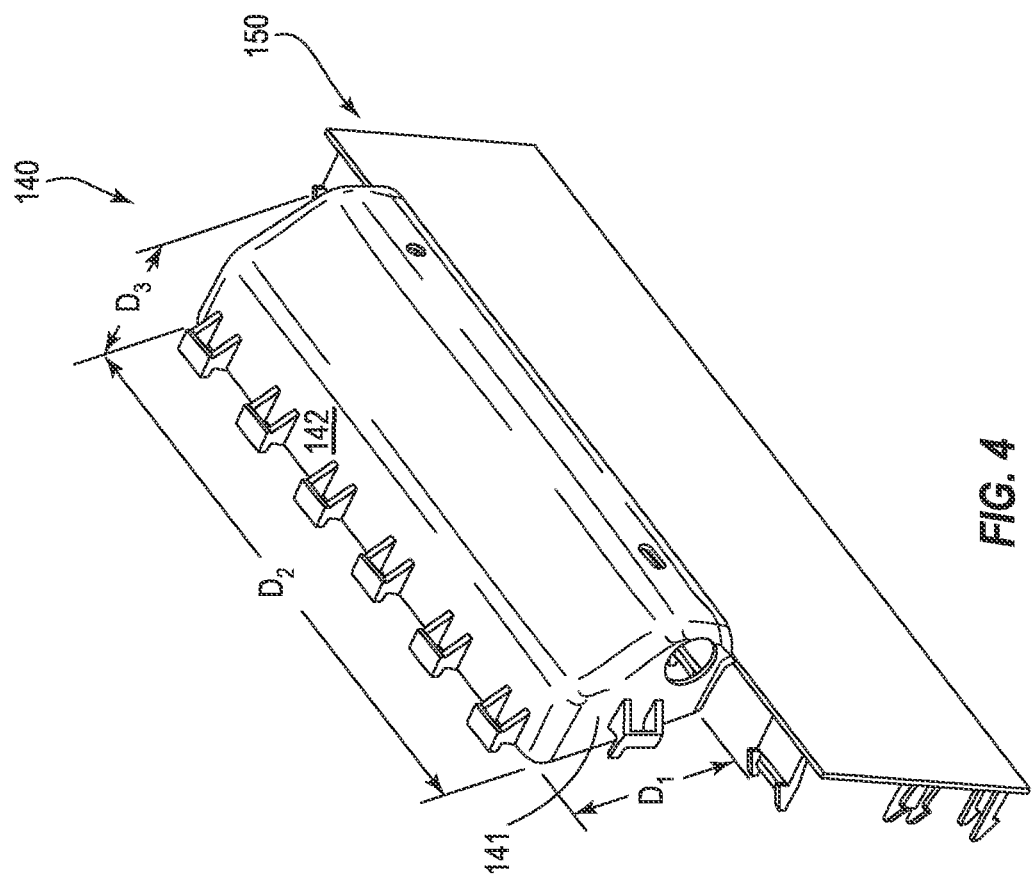
FIG. 4 is a rear perspective view of the housing and cover of FIG. 1A.

FIG. 4 is a rear perspective view of housing 140 and cover 150, as depicted in FIG. 3. As described herein, housing 140 may comprise lateral sidewalls 141, longitudinal sidewalls 142, and one or more back walls 144. The various walls form an interior void and define the dimensions of the housing. The various dimensions of housing 140 may be varied for use with different size airbags and different vehicles. $D_1$ may be within a range between about 30 mm to about 60 mm. $D_2$ may be within a range between about 50 mm and about 90 mm. $D_3$ may be within a range of about 200 mm to about 500 mm. Generally, $D_1$ and $D_3$ need to be at least about 3 mm larger than a diameter of the inflator, so the folded inflatable airbag can be installed into the housing.

Figure 5:
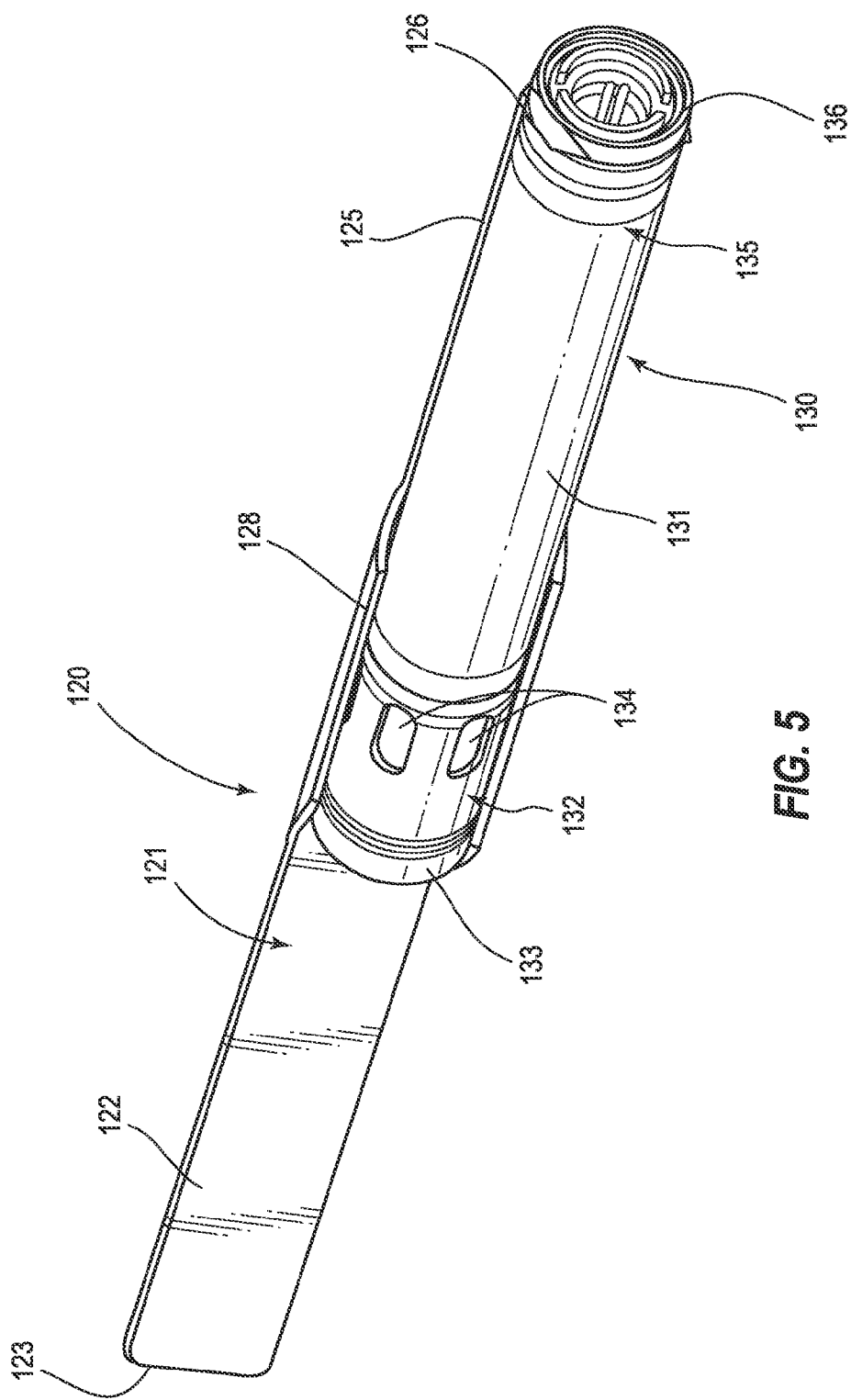
FIG. 5 is a front perspective view of a portion of the airbag housing assembly of FIG. 1, which depicts an inflator coupled to a one-piece inflator mounting bracket and heat shield.
Figure 6:
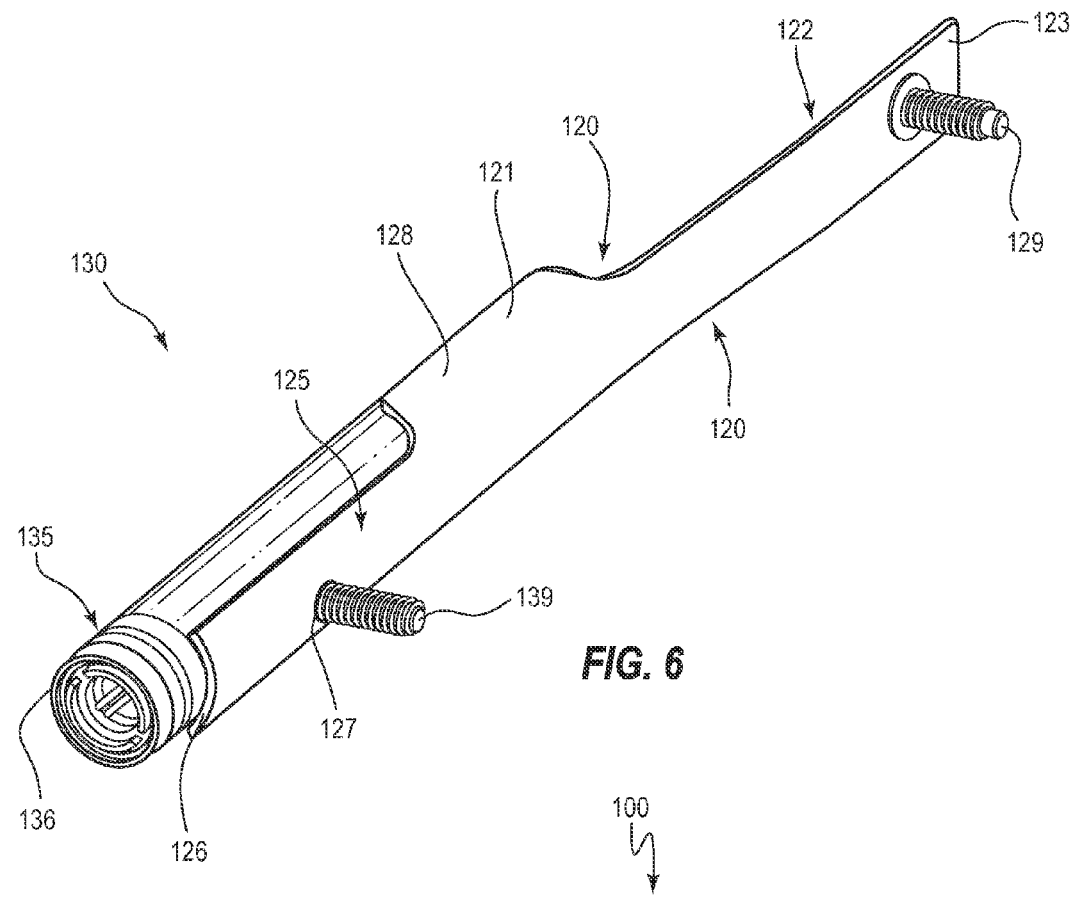
FIG. 6 is a rear perspective view of the inflator and inflator mounting bracket of FIG. 5.

FIGS. 5-6 are front and rear perspective views, respectively, of inflator mounting bracket 120 and inflator 130. Mounting bracket 120 may be said to comprise a one-piece mounting bracket and heat shield. Mounting bracket 120 may comprise a body 121 with a first end 122 and a second end 125. First end 122 has a first terminus 123, and may comprise a mounting stem 129. Second end 125 has a second terminus 126, and may comprise a mounting aperture 127. Bracket 120 has a heat shield 128 that comprises a curved portion that partially surrounds a portion of inflator 130 from which inflation gas may exit. In the depicted embodiment, first end 122 may be flattened and planar, and second end 125 may be curved.

Inflator 130 has a tubular body 131 that has a first end 132 and a second end 125. First end 132 has a first terminus 133 and may comprise vents 134, from which inflation gas may exit the inflator, after the inflator is activated. Second end 135 has a second terminus 136, and mounting stem 139 may be located at the second end; alternatively, the mounting stem may be located at a middle portion of the inflator. Second terminus 136 may comprise an electric or electronic connection that is configured to allow inflator 130 to be placed in electronic communication with vehicle sensors. Mounting stem 139 is configured to protrude through aperture 127 of inflator mounting bracket 127.

Figure 7:
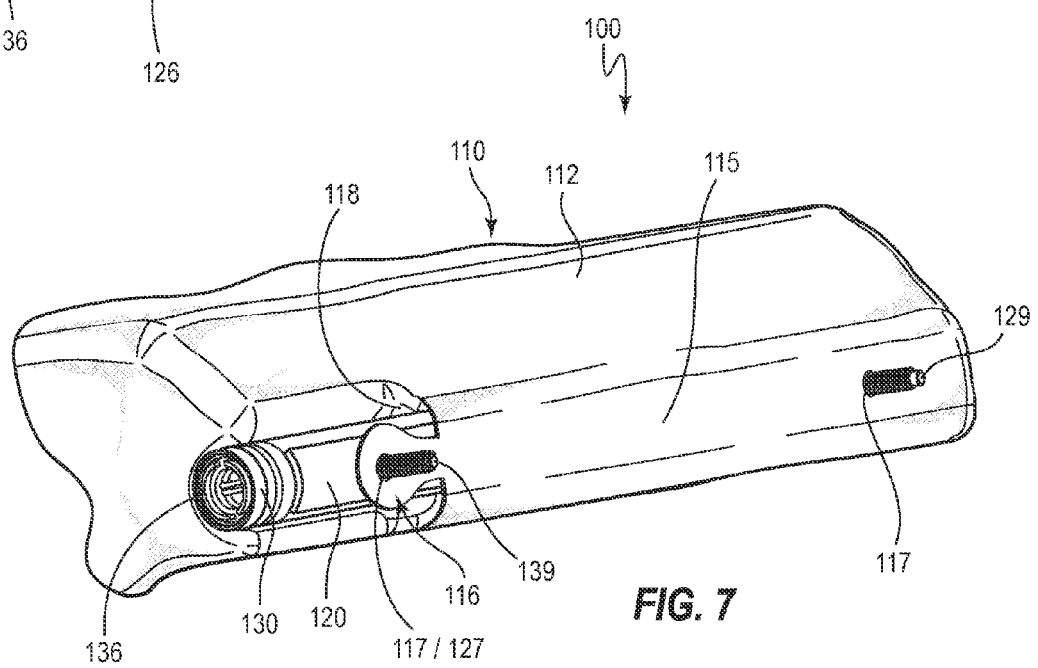
FIG. 7 is a rear cutaway perspective view of a portion of the airbag assembly of FIG. 1 in which the inflator and one-piece mounting bracket and heat shield has been coupled to the airbag.

FIG. 7 is a rear perspective view of bottom portion 112 of inflatable airbag 110 after inflator 130 and inflator mounting bracket 120 have been placed in a mounted configuration. Inflator 130 and inflator mounting bracket 120 have been coupled together as in FIG. 6 and inserted into inflator insert aperture 118 of airbag 110, such that mounting stem 129 of the inflator mounting bracket protrudes through aperture 117. Likewise, mounting stem 139 of inflator 130 is protruding through apertures 117 and 127 of airbag 110 and inflator mounting bracket 120. Airbag 110 may comprise an inflator mounting tab 116. In the mounted configuration, terminus of 136 of inflator 130 is accessible. In one embodiment, mounting stem 129 is located about 10 mm from first terminus 123.

A distance $D_4$ between inflator mounting stem 139 and inflator mounting bracket stem 129 may be between about 80 mm and 400 mm. Distance $D_4$ may be described as an airbag clamping length. Generally, a clamping length that is short compared to an airbag's width and/or an airbag housing's width can cause excessive rotation (skewing) during deployment. In this case, a stabilizer strap can be employed to oppose skewing during deployment. A short clamping length may be about 25% of an airbag housing's width. If two inflator mounting stems are coupled to an inflator, the resulting clamping length is typically about 80 mm, which can be considered a short clamping length. A clamping width that is longer helps to stabilize the airbag during deployment. A suitable clamping length may be within a range of about 50% to about 95% of a width of an airbag housing.

Figure 8A:
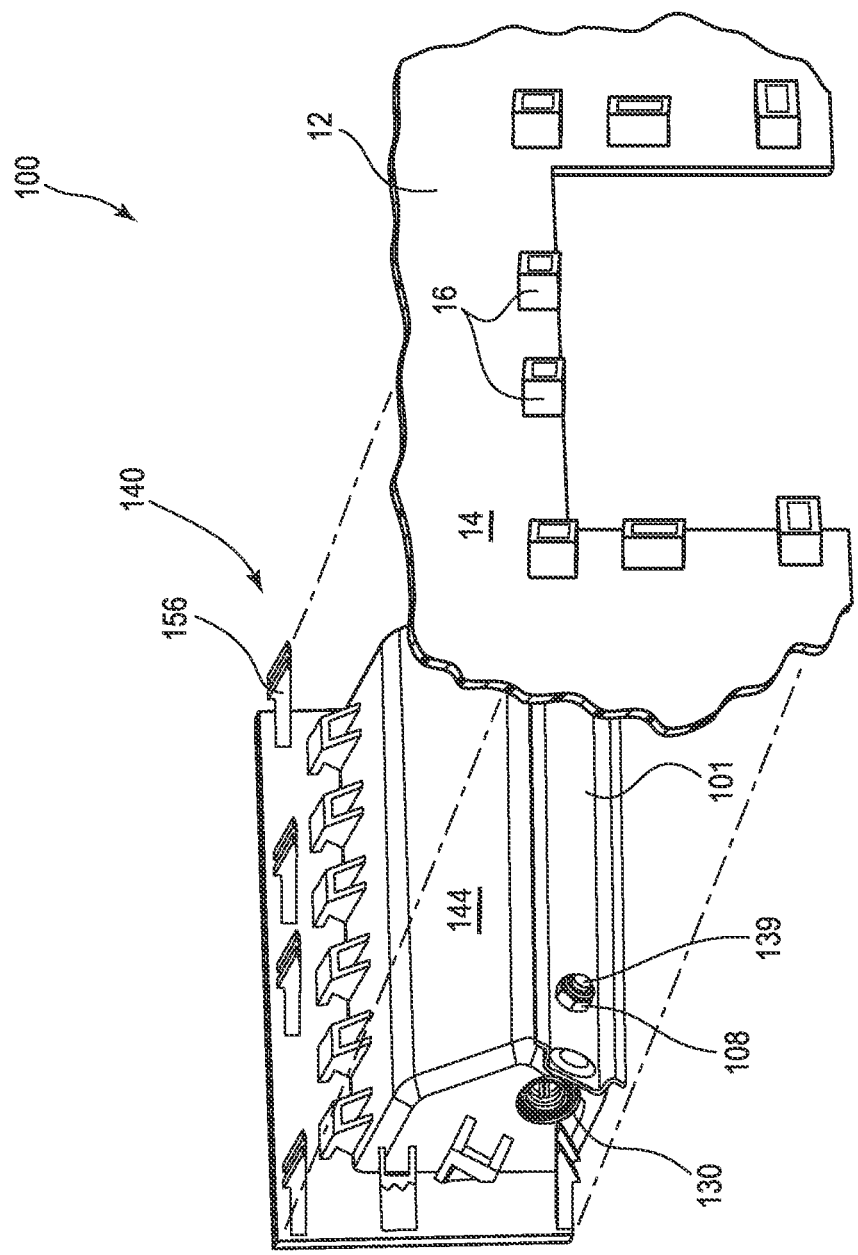
FIG. 8A is a rear cutaway perspective view of the airbag housing assembly of FIG. 1A before the housing has been coupled to the knee bolster.
Figure 8B:
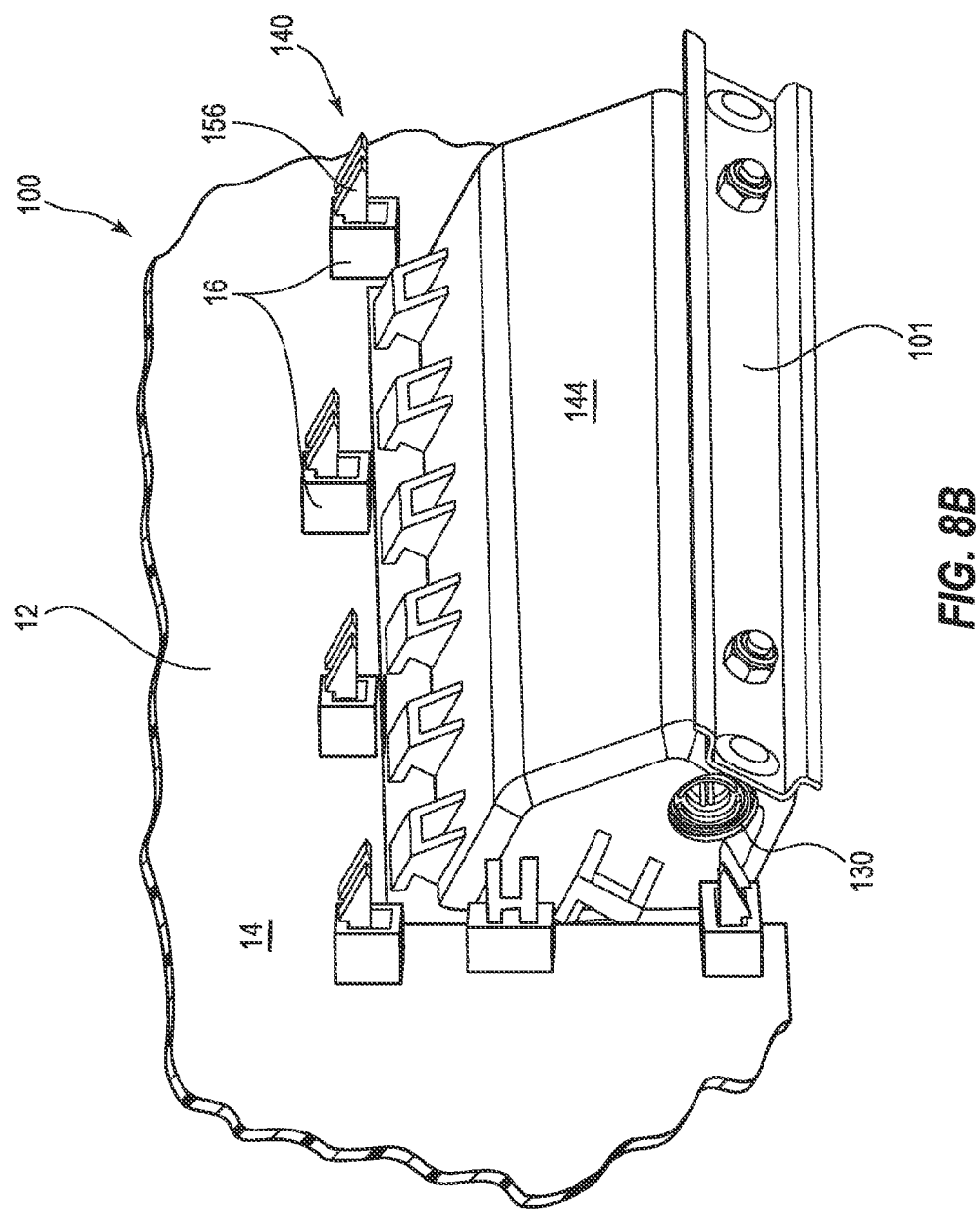
FIG. 8B is a rear cutaway perspective view of the airbag housing assembly of FIG. 8A after the housing has been coupled to the knee bolster.

FIGS. 8A-8B are rear perspective views of airbag assembly 100, wherein FIG. 8A depicts assembly 100 before the assembly has been coupled to knee bolster 12 and FIG. 8B depicts the assembly after it has been coupled to the knee bolster. Inflatable airbag assembly 100 is depicted as being in a packaged configuration, wherein the airbag, inflator 130, inflator mounting bracket, and housing 140 are coupled by mounting stems of the inflator mounting bracket and inflator 139. Inflator mounting stem 139 also protrudes through mounting bracket 101 and nut 108 may apply pressure on the components of the assembly to retain them in a predetermined position. Back panel 144 of housing 140 is oriented toward a front face of the knee bolster and is in position to be coupled to knee bolster 12 via coupling structures 156 being attached to coupling structures 16 on rear face 14 of the knee bolster.

Figure 9:
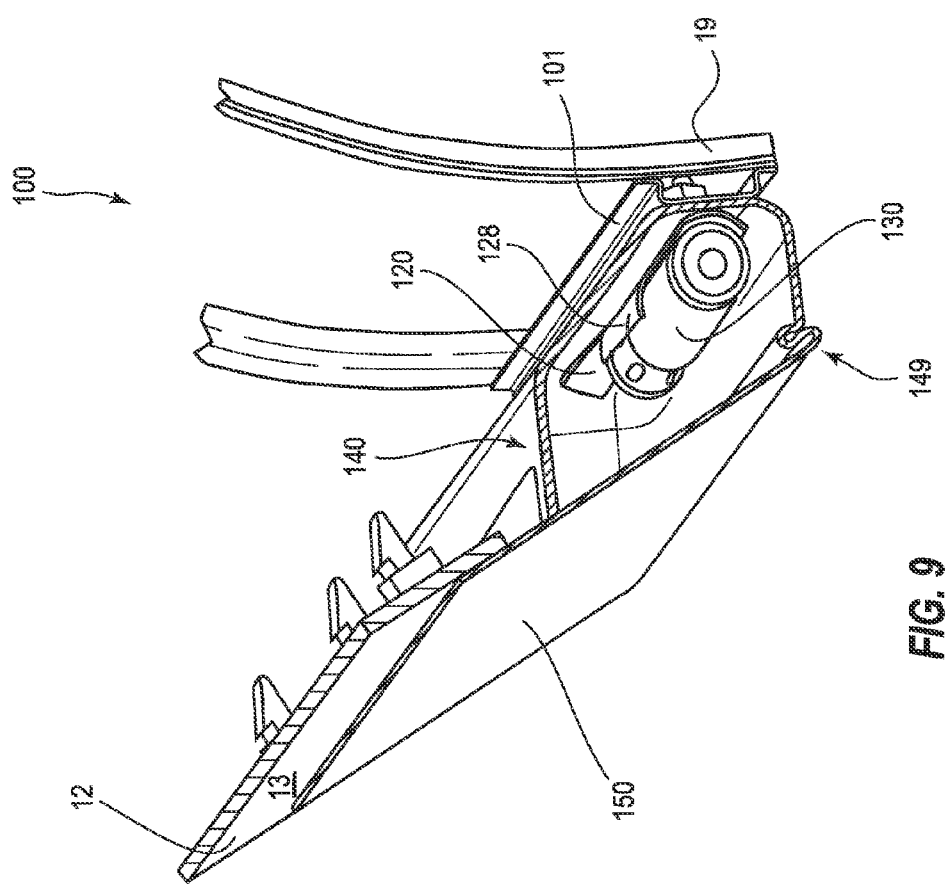
FIG. 9 is a side cutaway perspective view of the airbag housing assembly of FIG. 8B.

FIG. 9 is a cutaway side perspective view of inflatable airbag assembly 100 after the assembly has been coupled to knee bolster 12 and a vehicle structure 19. Cover 150 is depicted as being located in front of front face 13 of knee bolster 12. Cover 150 may be reversibly opened by rotating around hinge 149. Inflator 130 is coupled adjacent to inflator mounting bracket 120, and heat shield 128 is located such that during deployment, inflation gas and heat may be directed away from predetermined portions of the airbag assembly. In the view of FIG. 9, the inflatable airbag cushion is not visible. The housing may be coupled to a vehicle structure by airbag housing mounting bracket 101.

Figure 10:
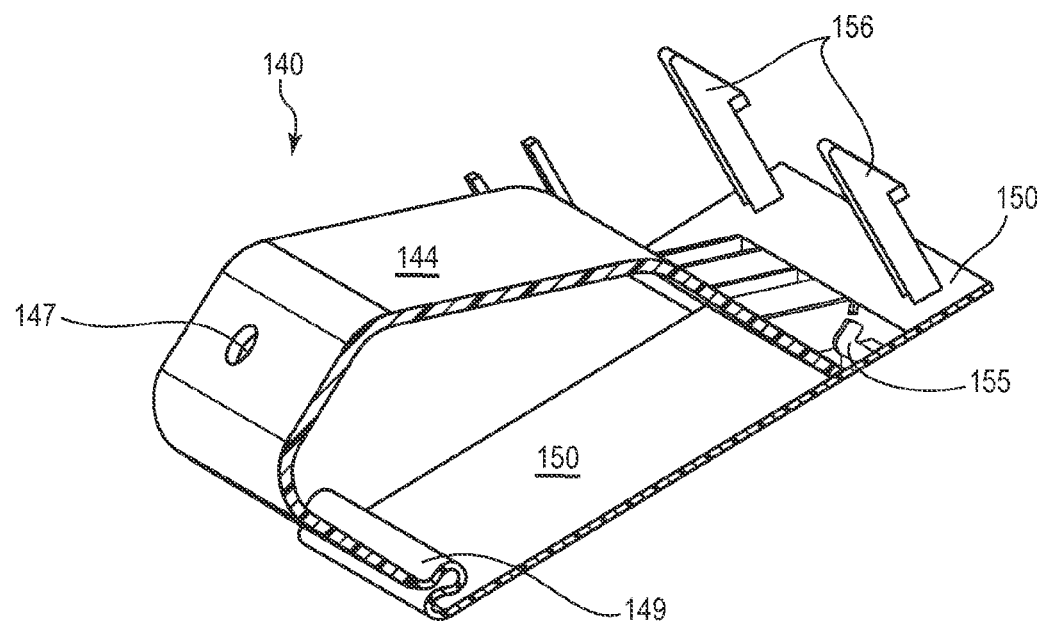
FIG. 10 is a cross sectional view of the inflatable airbag housing of FIG. 1A.

FIG. 10 is a rear cross-sectional view of inflatable airbag assembly 100, wherein the assembly is not depicted as being coupled to a vehicle knee bolster. Back panel 144 of housing 140 has an aperture 147 for receiving a mounting stem from the inflator mounting bracket or the inflator. Hinge 149 comprises a contiguous extension of airbag housing 140 and cover 150. Cover closing structure 155 is configured to allow the cover to be reversibly closed, and coupling structures 156 are configured to allow the housing to be coupled to a vehicle and allow cover 150 to open during airbag deployment.

Figure 11:
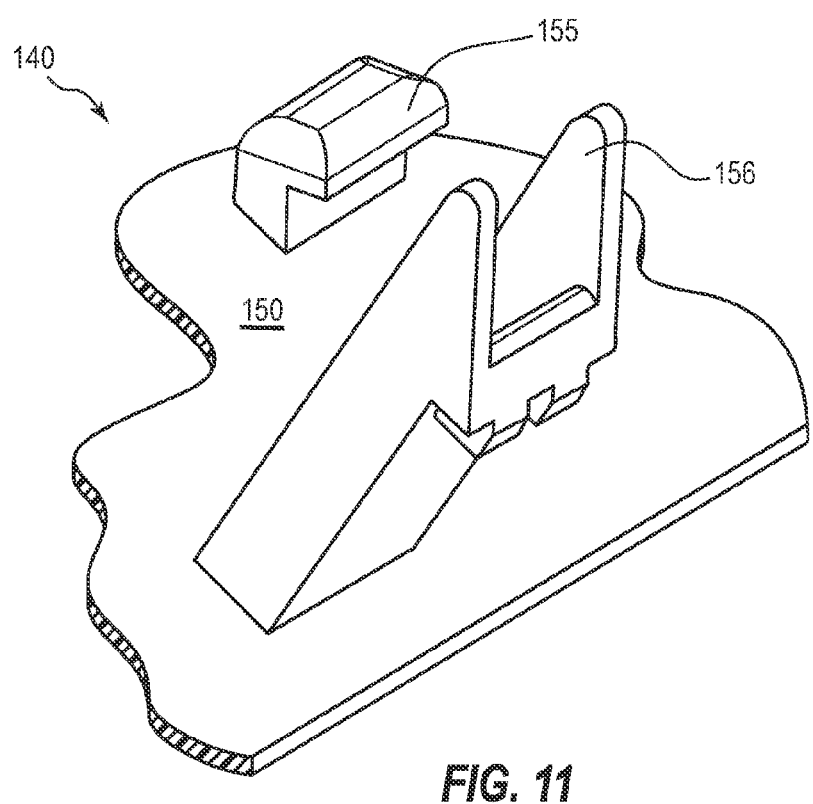
FIG. 11 is a close up cutaway perspective view of a portion of the inflatable airbag housing of FIG. 1A.

FIG. 11 is a close up perspective view of a portion of cover 150 of inflatable airbag housing 140. Cover closure structure 155 comprises a "hook" or "L" shaped structure that is configured to reversibly interact with a complementary structure on housing 140. Likewise, coupling structure 156 is configured to interact with a coupling structure located on a knee bolster, such that inflatable airbag housing 140 can be coupled to the knee bolster, yet cover 150 can be opened during airbag deployment. As described herein, structure 156 may be configured to fail during airbag deployment, such that at least a portion of structure 156 is separated from cover 150. Likewise, structure 155 may be configured to fail during airbag deployment, such that cover 150 can open. One skilled in the art will recognize that both structures 155 and 156 may be independently configured to fail or reversibly interact with a complementary structure to allow the airbag housing cover to open during airbag deployment.

Figure 12A:
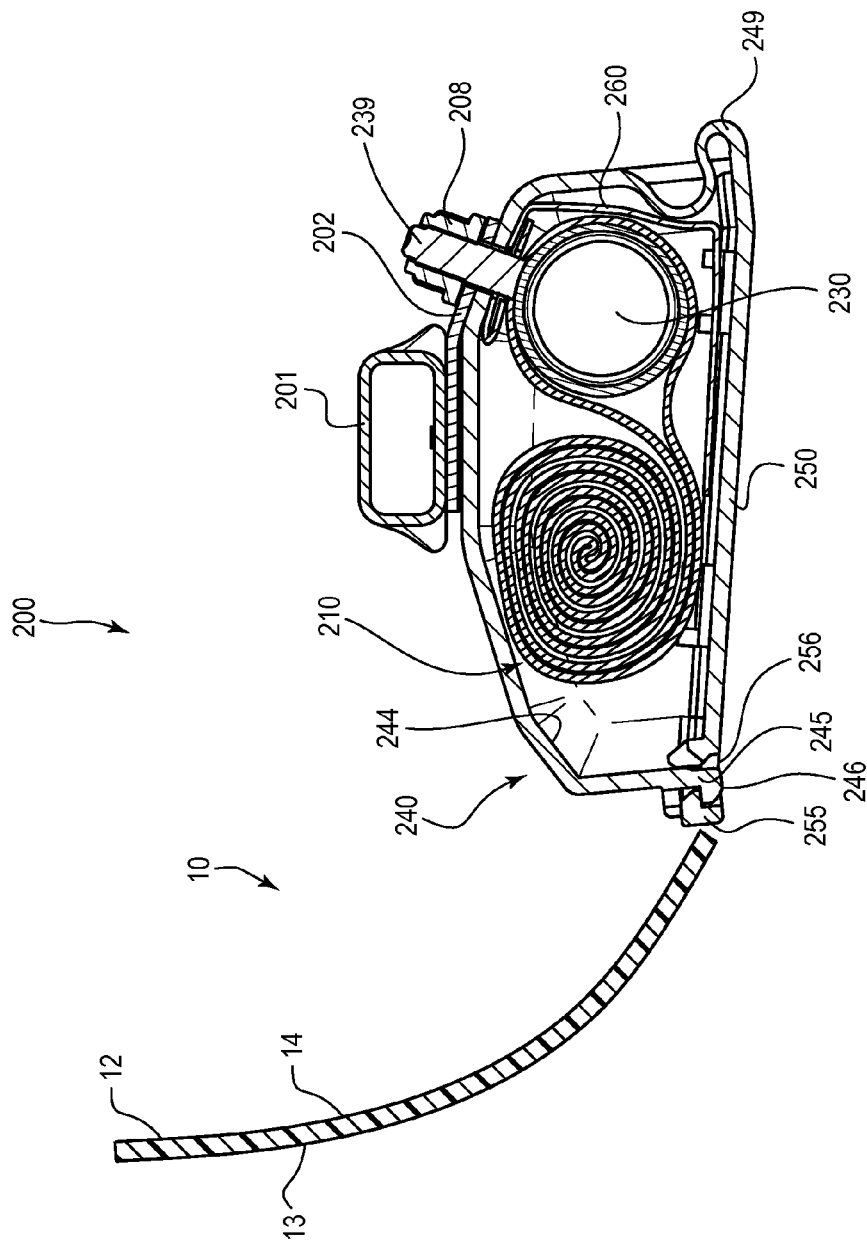
FIG. 12A is a cross-sectional view of another embodiment of an inflatable airbag assembly comprising an inflatable airbag housing assembly with an integral cover, wherein the airbag assembly is in a packaged configuration.
Figure 12B:
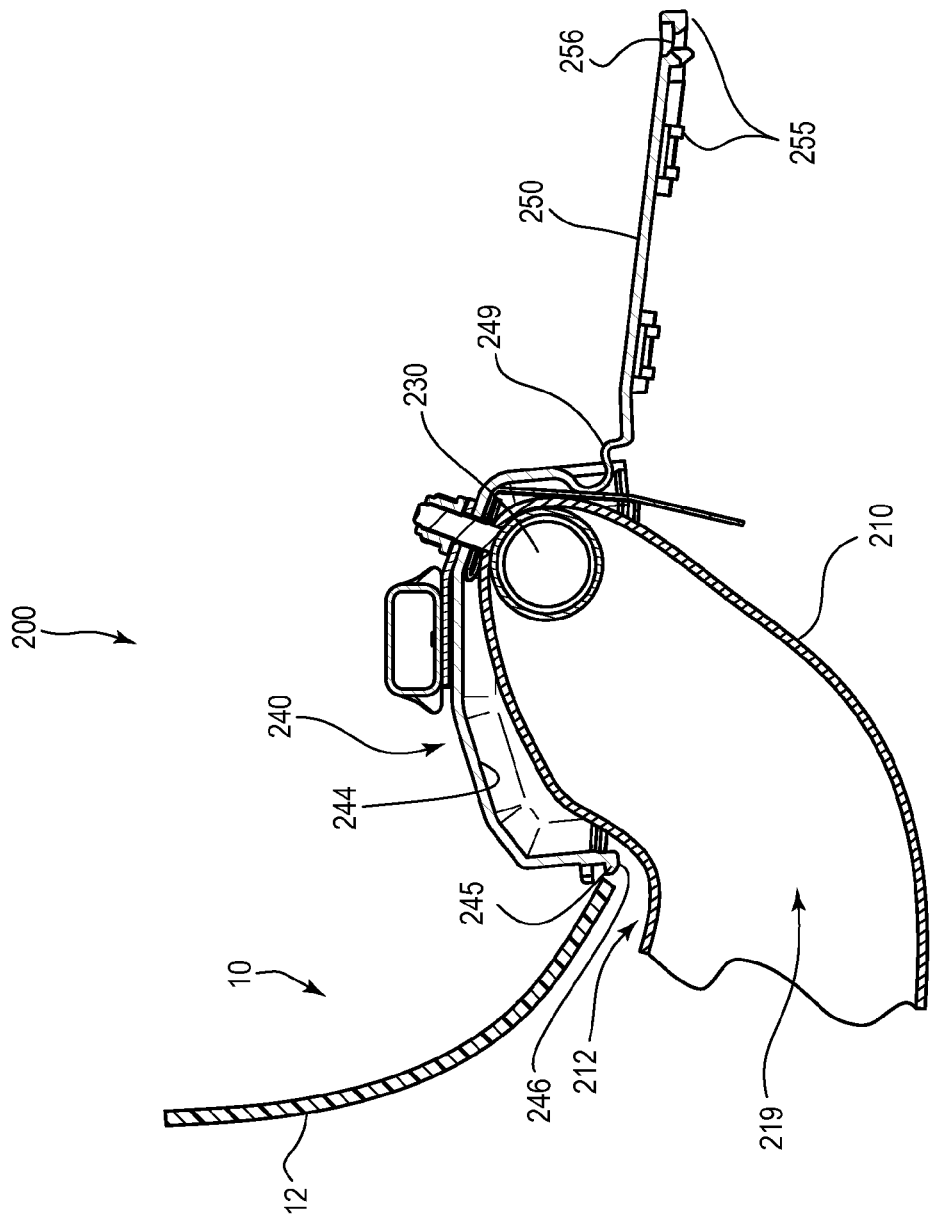
FIG. 12B is a cross-sectional view of the inflatable airbag assembly of FIG. 12A, wherein the airbag and housing assembly are in a deployed configuration.

FIGS. 12A-12B depict another embodiment of an inflatable airbag assembly 200 coupled to a knee bolster 12 at a "low mount" position. A low mount position may also be said to be "underneath" the instrument panel and may not be visible to an occupant seated opposite the airbag assembly.

Airbag assembly 200, housing 240, and cover 250 can resemble airbag assembly 100, housing 140, and cover 150 described above, in certain respects; accordingly, like features may be designated with like reference numerals, with the leading hundreds numeral incremented from "1" to "2". Any suitable combination of the features described with respect to airbag assembly 100, housing 140, and cover 150 can be employed with assembly 200 and vice versa.

FIG. 12A depicts airbag assembly 200 from a cross sectional view, wherein assembly 200 has been mounted within a vehicle 10. Inflatable airbag assembly 200 may comprise a housing mounting bracket 201, an inflatable airbag cushion 210, an inflator 230, and a housing 240, and a deployment strap 260. Housing 240 comprises an integrated cover 250, such that housing 240 may be said to comprise a one-piece housing with a cover that is attached via a hinge 249. Inflatable airbag assembly 200 may be said to comprise an inflatable airbag housing assembly.

Inflator 230 may comprise one or more mounting structures 239, which may comprise mounting stems, such as a threaded bolt. Mounting structure 239 is configured to protrude through apertures in the inflatable airbag, the inflator mounting bracket, the housing, the housing mounting bracket, and a complementary mounting hardware, such as nut 208. Inflatable airbag housing 240 may comprise a contiguous piece of a molded plastic material that comprises four sidewalls, which define an interior space 243, a back wall 244, a plurality of cover closure structures 245 and 255, a plurality of mounting apertures 256, and hinge 249.

Housing 240 sidewalls comprise longitudinal sidewalls 242 and lateral sidewalls 241. Back wall 244 may comprise a single, linear surface, or a plurality of surfaces, as depicted in FIG. 12A. Cover closure structures 245 may each comprise a protrusion 246 that is configured to interact with a structure on cover closure structures 255. Cover 250 has a first face 251 and a second face 252, and may comprise a plurality of cover closure structures 255. Inflatable airbag assembly 100 may be mounted within vehicle 10 at or below a knee bolster portion 12 of an instrument panel or below a steering wheel. The knee bolster portion of an instrument panel may be said to comprise approximately a lower half of the instrument panel.

FIG. 12B is a cross-sectional view of airbag assembly 200 of FIG. 12A, wherein airbag 210 is depicted in a deployed configuration. Airbag 210 is configured to become inflated upon activation of inflator 230 such that the inflatable airbag transitions from the packaged configuration to the deployed configuration. Airbag 210 may be described as having an upper portion (not visible) and a lower portion 212. Lower portion 212 may also be called a "throat" or "neck" portion of the airbag. The various faces of inflatable airbag 210 define an interior inflatable void 219, which is in fluid communication with inflator 230.

In the depiction of FIG. 12B, cover 250 has rotated about hinge 249 such that airbag 210 can exit interior space 243. The force of inflation gas inflating airbag 210 may apply pressure to cover 250, thereby forcing the cover to open. Cover 250 closure structure 255 has been released from closure structure 245 on the housing by the "L" shaped structure 255 being pulled off closure structure 245.

Figure 13:
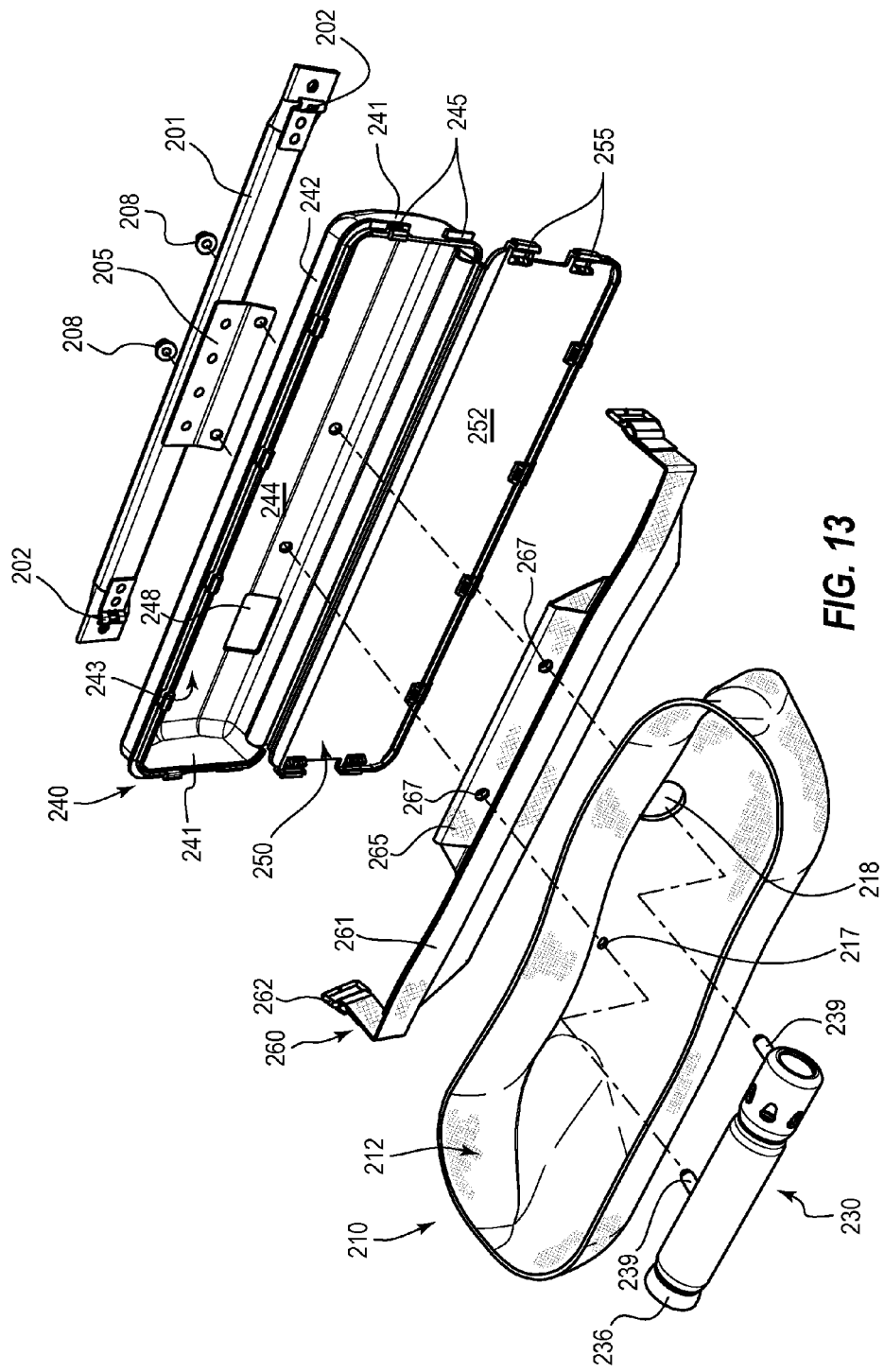
FIG. 13 is a front exploded perspective view of one embodiment of an inflatable airbag housing assembly having an integrated cover.
Figure 14:
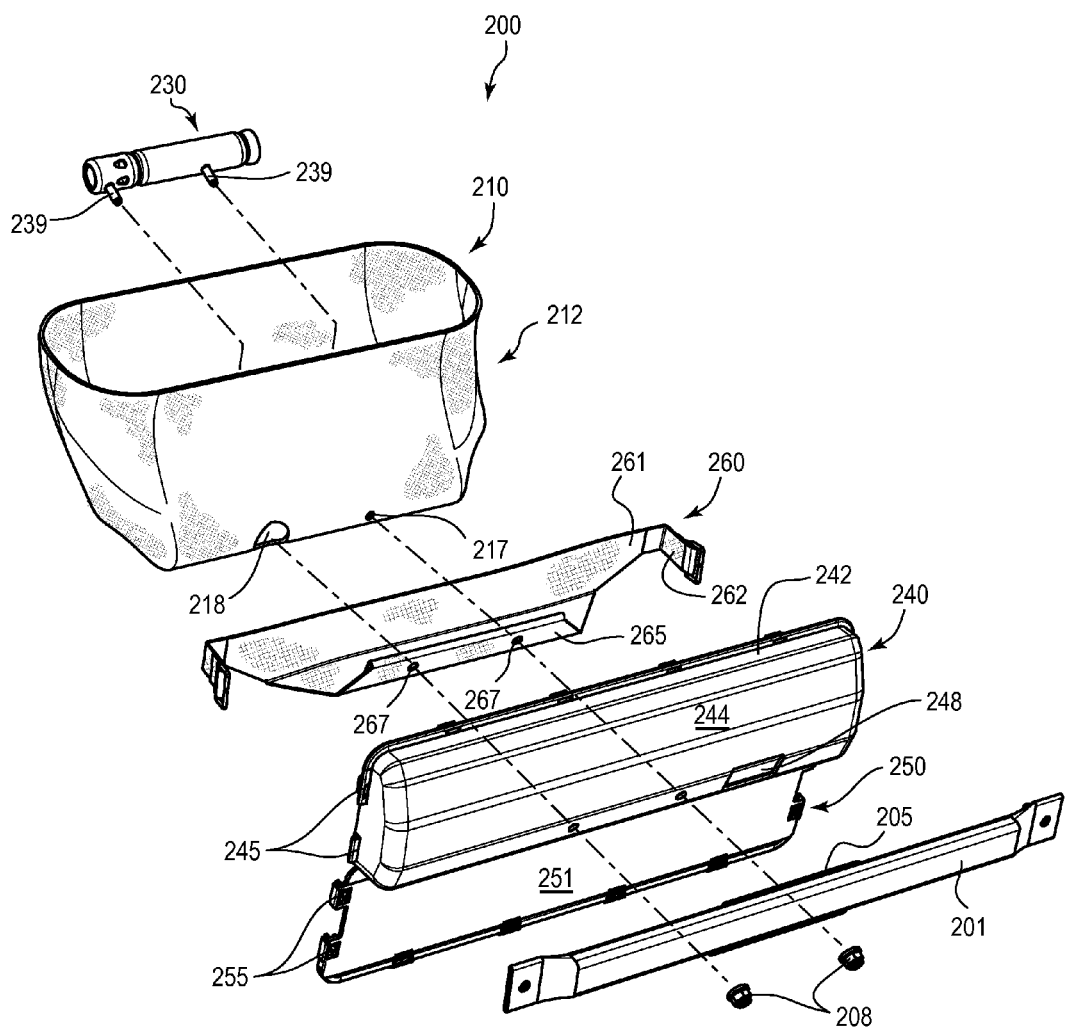
FIG. 14 is a rear exploded perspective of the housing assembly as depicted in FIG. 13.

FIGS. 13-14 are exploded perspective views of inflatable airbag assembly 200. Inflator 230 comprises a terminus 236 and two mounting stems 239. Mounting stems 239 are configured to protrude through aperture 217 and aperture 218 located on lower portion 212 of airbag 210. Mounting stems 239 are also configured to protrude through, apertures 267 in deployment strap 260, apertures 247 in housing 240, and apertures 207 in mounting plate 205. Mounting stems 239 may each be configured to receive a nut 208. Inflator 230 is configured to fit within bottom portion 212 of airbag 210, which itself is configured to fit within interior space 243 and against back wall 244 of housing 240.

As described above, interior space 243 of housing 240 is partially defined by lateral sidewalls 241 and longitudinal sidewalls 242. Cover closure structures 245 are positioned on the sidewalls and are configured to receive cover closure structures 255 on cover 250. One of the lateral sidewalls may comprise an inflator insert aperture 248, which is configured to be aligned with inflator insert aperture 218 of cushion 210 such that terminus 236 of inflator 230 can be accessed even after assembly 200 is in a packaged configuration. Cover 250 is depicted in an open configuration, wherein first face 251 is oriented toward back wall 244 and second face 252 is oriented toward airbag 210. Cover 250 comprises cover closure structures 255, which have mounting apertures 256. Cover 250 is configured to rotate about hinge 249 so that the cover can be reversibly closed.

Deployment strap 260 is configured to help direct the movement of the cushion in a predetermined direction or deployment trajectory. Deployment strap 260 may provide resistance to the airbag cushion during deployment, wherein the strap resists the movement of the cushion in a car forward and downward direction. Thus, the airbag is directed in a car rearward and upward direction. Deployment strap 260 comprises a strap portion 261, which may comprise opposing ends 262 that may each terminate with fasteners 263. Fasteners 263 are configured to reversibly couple to complementary structures 202 on mounting bracket 201. In the depicted embodiment, complementary structures 202 comprise hooks, and fasteners 236 comprise metal or plastic loops that fit over the hooks. During inflatable airbag deployment, fasteners 263 may become uncoupled from the housing complementary structures 202, such that deployment strap 260 ceases to be coupled to the housing. In other embodiments, the deployment strap may rupture during airbag deployment.

Figure 15:
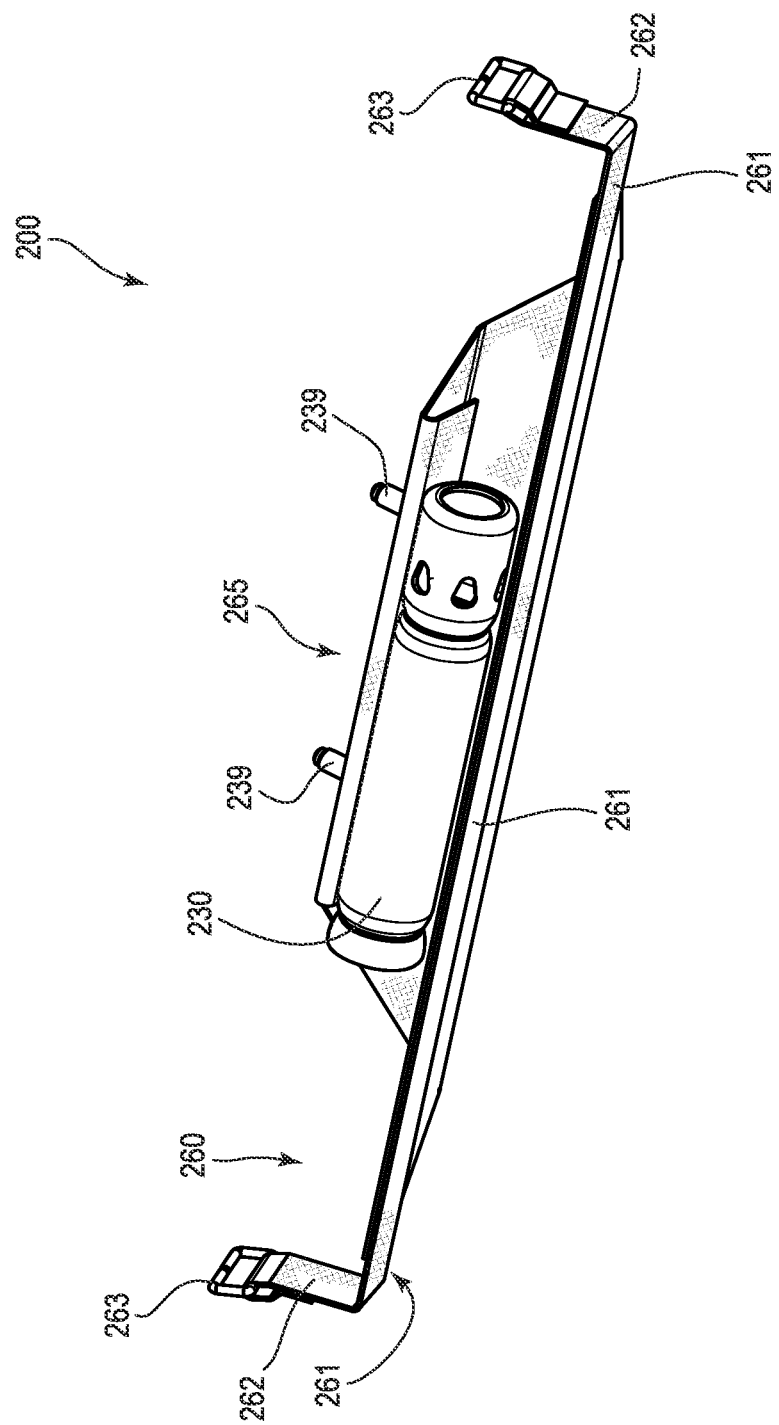
FIG. 15 is a perspective view of an inflator and deployment strap, which are components of the assembly of FIG. 12A.
Figure 16:
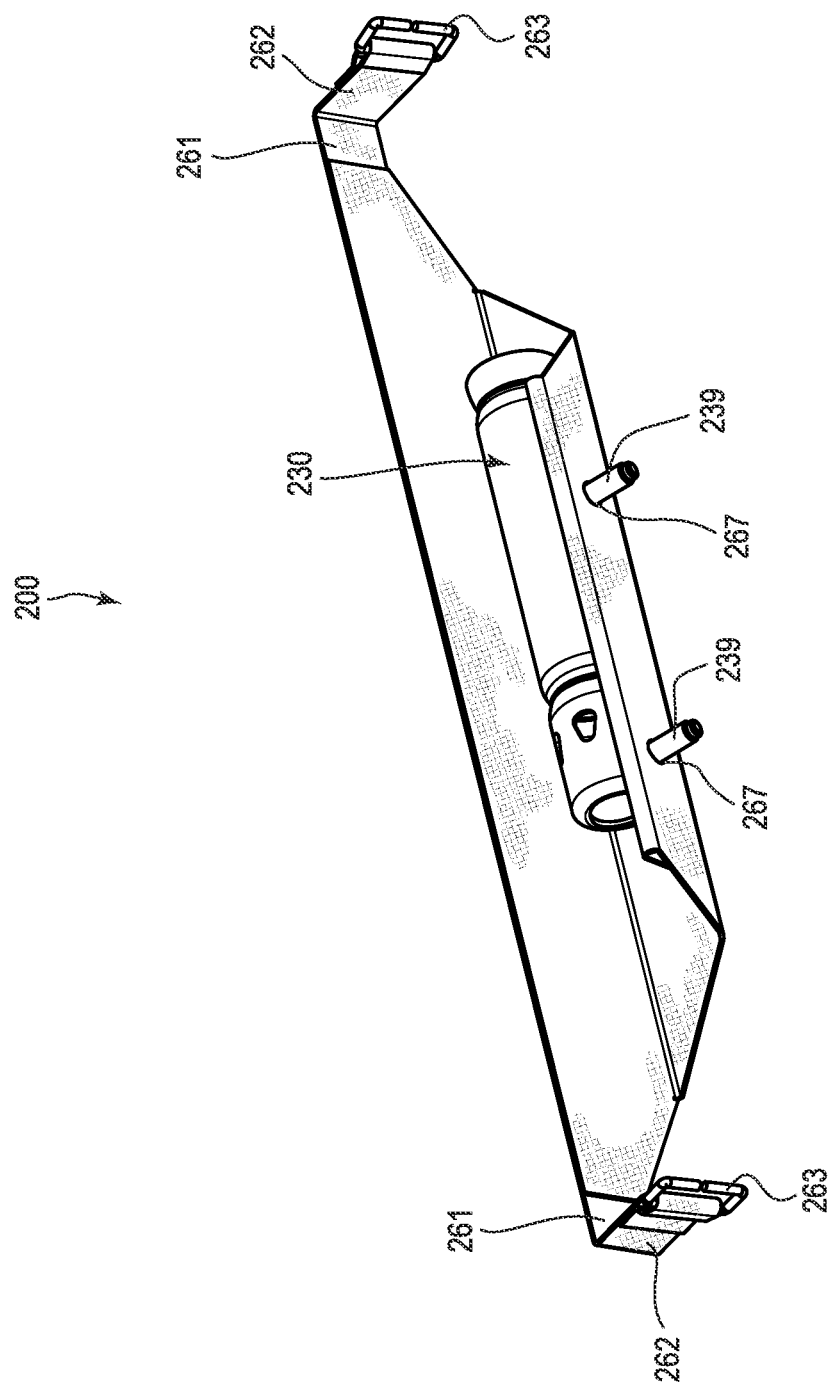
FIG. 16 is another perspective view of the assembly of FIG. 15.

FIGS. 15-16 are different perspective views of inflator 230 and deployment strap 260 after the inflator and deployment strap have been coupled together. Inflator 230 may comprise a tubular body 231 and two mounting stems 239. Deployment strap 260 may comprise a fabric material, such as a woven nylon material. In other embodiments, the deployment strap may comprise one or more different materials. Also, the deployment strap may comprise a plurality of pieces of a single material. Deployment strap 260 comprises a strap portion 261 that has two opposing ends 262 that may each terminate with fasteners 263. Deployment strap 260 also comprises an inflator coupling portion 265 that has two apertures 237 that are each configured to receive one mounting stem 239 of inflator 230. Strap portion 261 may comprise a separate elongated member that is sewn to inflator coupling portion 265. In another embodiment, strap portion 261 and inflator coupling portion 265 comprise a single piece of material. Opposing end portions 262 may comprise loops of strap portion 261 and may terminate with fasteners 263, which may comprise metal or plastic members.

Figure 17:
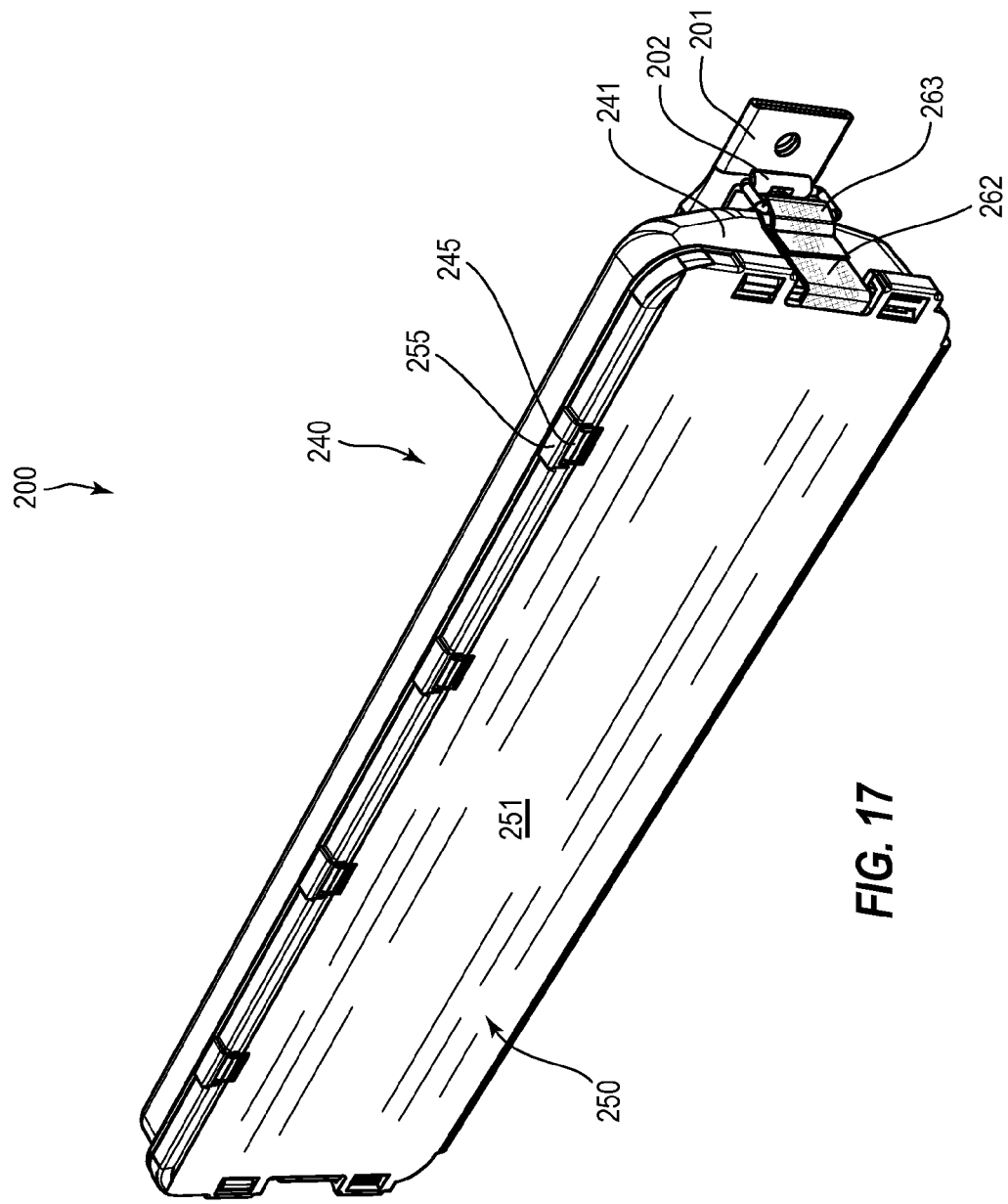
FIG. 17 is a perspective view of the assembly of FIG. 12A after the assembly has been placed in a packaged configuration.
Figure 18:
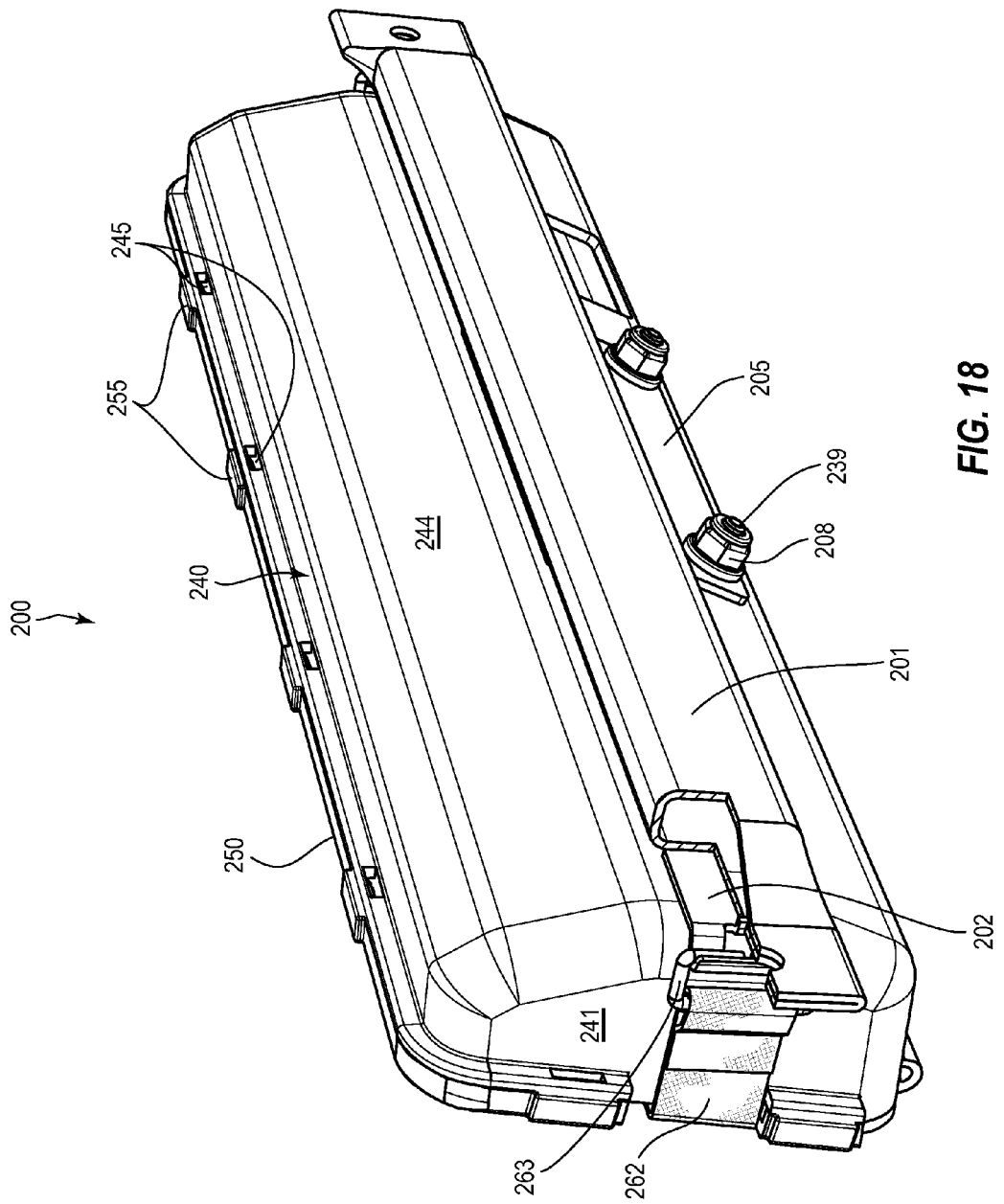
FIG. 18 is another perspective view of the assembly of FIG. 17 after the assembly has been placed in a packaged configuration.

FIGS. 17-18 illustrate two perspective views of assembly 200 after the assembly has been arranged into a packaged configuration. In the packaged configuration, cover closing structures 255 of cover 250 are reversibly interacting with complementary cover closing structures 245 on housing 240.

In the closed configuration, first face 251 of the housing cover faces outward. Fasteners 263 of the deployment strap run approximately parallel with lateral sidewalls 241 and are coupled to strap mounting members 202, which are themselves coupled to housing mounting member 201. Mounting member 201 is coupled to housing 240 on back wall 244 via mounting plate 205. Mounting plate 205 receives inflator mounting stems 239, such that the inflator can be said to couple together the inflatable airbag, the deployment strap, housing 240, mounting plate 205, and mounting bracket 201. Mounting hardware, depicted as a threaded nut, retains the components of assembly 200 in the coupled configuration.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag assembly, comprising:
   a housing comprising a first longitudinal sidewall, a second longitudinal sidewall, a first lateral sidewall, and a second lateral sidewall, wherein the first longitudinal sidewall and the second longitudinal sidewall are opposite to each other, and wherein the first lateral sidewall and the second lateral sidewall are opposite to each other;
   a cover connected to the first longitudinal sidewall of the housing by a hinge;
   an inflator, wherein the inflator is coupled to a mounting stem that is received by an aperture in the housing;
   an inflatable airbag coupled to the inflator;
   a deployment strap comprising an inflator coupling portion and a strap portion, wherein the mounting stem extends through the inflator coupling portion to couple the deployment strap to the inflator, wherein the deployment strap is positioned around the inflator and a portion of the inflatable airbag such that the strap portion extends adjacent to the cover prior to deployment of the inflatable airbag;
   wherein the housing, the cover and the hinge comprise a single piece of material,
   wherein the second longitudinal sidewall of the housing and the cover comprises a plurality of cover closing structures, and wherein the cover closing structures of the housing are complementary to the cover closing structures of the cover;
   wherein, during inflatable airbag deployment, the deployment strap resists movement of the inflatable airbag in a direction toward the hinge and directs the inflatable airbag upward toward the first longitudinal sidewall, which causes the cover closing structures of the housing and of the cover to cease interacting with each other such that the cover rotates at the hinge and transitions from a closed configuration to an open configuration and causes the inflatable airbag to deploy in a car rearward and upward direction; and
   wherein the cover continues to be coupled to the housing via the hinge after the cover transitions to the open configuration.

2. The inflatable airbag assembly of claim 1, wherein the inflator mounting stem is coupled to a portion of the housing other than the cover.

3. The inflatable airbag assembly of claim 1, wherein the lateral sidewalls of the housing and the cover comprises another plurality of cover closing structures.

4. The inflatable airbag assembly of claim 1, wherein each of the cover closing structures on the airbag housing comprises an aperture.

5. The inflatable airbag assembly of claim 4, wherein each aperture of the cover closing structures on the airbag housing extends beyond the second longitudinal sidewall.

6. The inflatable airbag assembly of claim 1, wherein each of the cover closure structures of the housing comprises an "L" shape.

7. The inflatable airbag assembly of claim 1 wherein each of the cover closing structures of the cover comprises integral extensions of the cover.

8. The inflatable airbag assembly of claim 1, wherein the cover closing structures on the housing comprise push pins, and the cover closing structures on the cover comprise apertures that are configured to receive the push pins.

9. The inflatable airbag assembly of claim 1, wherein the cover closing structures on the housing comprise apertures, and the cover closing structures on the cover comprise push pins that are configured to be received by the apertures on the housing.

10. The inflatable airbag assembly of claim 1, wherein the inflator and the mounting stem are directly attached to each other.

11. The inflatable airbag assembly of claim 1, wherein the inflator is coupled to two mounting stems.

12. The inflatable airbag assembly of claim 11, wherein each of the mounting stems are directly attached to the inflator.

13. The inflatable airbag assembly of claim 1, wherein the assembly is configured to be mounted at a low mount position below a knee bolster of a vehicle.

14. The inflatable airbag assembly of claim 1, wherein the deployment strap comprises a woven nylon material.

15. The inflatable airbag assembly of claim 1, wherein the strap portion of the deployment strap has opposing ends.

16. The inflatable airbag assembly of claim 15, wherein each end terminates with a fastener.

17. The inflatable airbag assembly of claim 16, wherein each fastener is configured to be coupled to a complementary structure.

18. The inflatable airbag assembly of claim 16, wherein the assembly further comprises a mounting bracket coupled to the housing, wherein the ends of the strap portion extend out of the housing, and wherein each fastener is configured to couple to a complementary structure on the mounting bracket.

19. The inflatable airbag assembly of claim 18, wherein the mounting bracket is coupled to a rear portion of the housing via the mounting stem.

* * * * *